(12) United States Patent
Lax

(10) Patent No.: US 6,561,347 B1
(45) Date of Patent: May 13, 2003

(54) CASE AND LOCK WITH IMPROVED DISC PROTECTION

(75) Inventor: Michael Lax, Westbury, NY (US)

(73) Assignee: Autronic Plastics, Inc., Westbury, NY (US)

(*) Notice: Subject to any disclaimer, the term of this patent is extended or adjusted under 35 U.S.C. 154(b) by 0 days.

(21) Appl. No.: 09/696,614

(22) Filed: Oct. 25, 2000

Related U.S. Application Data

(60) Provisional application No. 60/163,192, filed on Nov. 2, 1999.

(51) Int. Cl.⁷ .............................................. B65D 85/57
(52) U.S. Cl. ...................... 206/308.2; 70/63; 206/1.5; 206/308.1; 206/472
(58) Field of Search ................... 70/57.1, 63; 206/1.5, 206/308.1, 308.2, 308.3, 310, 387.11, 387.13, 472, 807, 303, 307, 307.1, 387.1; 220/315; 229/125.125

(56) References Cited

U.S. PATENT DOCUMENTS

| | | | |
|---|---|---|---|
| 3,685,684 A | | 8/1972 | Schindler et al. |
| 3,837,692 A | | 9/1974 | Ayers et al. |
| 3,933,381 A | | 1/1976 | Schurman |
| 3,949,928 A | * | 4/1976 | Perkins ................ 229/125.125 |
| 4,084,690 A | * | 4/1978 | Pulse ......................... 206/310 |
| 4,176,744 A | * | 12/1979 | Borzak ....................... 206/310 |
| 4,184,594 A | | 1/1980 | Hehn |
| 4,204,724 A | | 5/1980 | Bauer et al. |
| 4,211,337 A | | 7/1980 | Weavers et al. |
| 4,235,334 A | * | 11/1980 | Ahn ......................... 206/387.1 |
| 4,279,373 A | * | 7/1981 | Montealegre ........ 229/125.125 |
| 4,291,801 A | | 9/1981 | Basili et al. |
| 4,293,266 A | * | 10/1981 | St. Lawrence et al. . 206/387.13 |
| 4,365,711 A | | 12/1982 | Long et al. |
| 4,469,225 A | | 9/1984 | Takahashi |
| 4,476,978 A | | 10/1984 | Saito |
| 4,522,312 A | | 6/1985 | Rathgeber et al. |
| 4,545,502 A | | 10/1985 | Reuter |
| 4,658,955 A | * | 4/1987 | Eichner ....................... 206/1.5 |

(List continued on next page.)

FOREIGN PATENT DOCUMENTS

| | | |
|---|---|---|
| DE | 3316802 | 11/1984 |
| EP | 211088 | 2/1987 |
| EP | 312172 | 4/1989 |
| FR | 2628250 | 9/1989 |
| FR | 2628717 | 9/1989 |
| GB | 2036697 | 7/1980 |
| GB | 2129779 | 5/1984 |
| JP | 9132287 | 5/1997 |
| JP | 10-116394 | 5/1998 |
| WO | WO00/34954 | 6/2000 |

Primary Examiner—Jim Foster
(74) Attorney, Agent, or Firm—Ostrolenk, Faber, Gerb & Soffen, LLP

(57) ABSTRACT

A storage case comprises a top cover, a bottom cover, and a spine. The bottom cover includes a hub portion having a cylinder and is disposed on a frustum shaped member. The diameter of the cylinder is smaller than the upper diameter of the frustum shaped member. A plurality of projections are arranged around the hub portion on the bottom cover. The projections each include a first projection having a first height and a second projection having a second height higher than the first height. The first projections define a first circle with a first diameter. The second projections define a second circle with a diameter which is larger than a diameter of the first circle. A hub coupling member having a crescent extending therefrom is disposed on the top cover. The top and bottom covers each have a side wall disposed near the spine which are effective to create a second wall, parallel with the spine, when the covers are closed. The top and bottom covers each have locking portions disposed inwardly from the top and bottom covers. These locking portions allow for a lock to be placed on the storage case while remaining flush with the side of the storage case.

89 Claims, 14 Drawing Sheets

U.S. PATENT DOCUMENTS

| | | |
|---|---|---|
| 4,676,370 A | 6/1987 | Rudick |
| 4,685,558 A | 8/1987 | Filiz et al. |
| 4,764,146 A | 8/1988 | Auer et al. |
| 4,793,479 A | 12/1988 | Otsuka et al. |
| 4,811,000 A | 3/1989 | Humphrey et al. |
| 4,921,097 A | 5/1990 | Finke et al. |
| 4,928,825 A | 5/1990 | Hehn |
| 4,966,020 A | 10/1990 | Fotheringham et al. |
| 4,972,690 A | 11/1990 | O'Sullivan |
| 4,974,740 A | 12/1990 | Niles et al. |
| 5,039,982 A | 8/1991 | Bruhwiler |
| 5,081,446 A | 1/1992 | Gill et al. |
| 5,145,068 A * | 9/1992 | Schmitz et al. .......... 206/387.13 |
| 5,147,034 A | 9/1992 | Broadhead et al. |
| 5,195,595 A | 3/1993 | Nakagawa |
| 5,205,401 A | 4/1993 | Weisburn et al. |
| 5,244,085 A | 9/1993 | Lammerant et al. |
| 5,251,750 A | 10/1993 | Gelardi et al. |
| 5,285,918 A | 2/1994 | Weisburn et al. |
| D347,320 S | 5/1994 | Du Corday |
| 5,359,809 A | 11/1994 | Johnson |
| 5,375,712 A | 12/1994 | Weisburn |
| 5,377,825 A | 1/1995 | Sykes et al. |
| 5,377,827 A | 1/1995 | Roth et al. |
| 5,390,515 A | 2/1995 | Essick |
| 5,400,902 A * | 3/1995 | Kaminski .................. 206/310 |
| 5,417,324 A | 5/1995 | Joyce et al. |
| D358,961 S | 6/1995 | Lax |
| 5,462,159 A | 10/1995 | Roth et al. |
| 5,494,156 A | 2/1996 | Nies |
| 5,515,968 A | 5/1996 | Taniyama |
| 5,526,926 A | 6/1996 | Deja |
| 5,529,182 A * | 6/1996 | Anderson et al. ........ 206/308.1 |
| 5,551,559 A | 9/1996 | Roth et al. |
| 5,551,560 A | 9/1996 | Weisburn et al. |
| 5,586,651 A | 12/1996 | Krummenacher |
| 5,588,315 A | 12/1996 | Holmgren |
| 5,593,030 A | 1/1997 | Tell |
| 5,593,031 A | 1/1997 | Uchida |
| 5,597,068 A | 1/1997 | Weisburn et al. |
| 5,598,728 A | 2/1997 | Lax |
| 5,609,249 A * | 3/1997 | Cheng .................... 206/308.1 |
| 5,626,225 A | 5/1997 | Joyce, Jr. |
| 5,636,535 A | 6/1997 | Shimada |
| 5,636,737 A | 6/1997 | Marsilio |
| 5,653,335 A * | 8/1997 | Bauer et al. ............. 206/308.1 |
| 5,660,274 A | 8/1997 | Chien |
| 5,662,218 A | 9/1997 | Ladwig |
| 5,680,782 A | 10/1997 | Komatsu et al. |
| 5,685,425 A | 11/1997 | Chois |
| 5,685,427 A | 11/1997 | Kuitems et al. |
| 5,697,496 A | 12/1997 | Bauer |
| 5,727,680 A | 3/1998 | Liu |
| 5,730,283 A | 3/1998 | Lax |
| 5,768,922 A | 6/1998 | Lax |
| 5,769,217 A | 6/1998 | Derraugh et al. |
| 5,772,028 A | 6/1998 | Marsilio et al. |
| 5,775,491 A | 7/1998 | Taniyama |
| 5,777,884 A | 7/1998 | Belka et al. |
| 5,782,348 A | 7/1998 | Burdett |
| 5,782,350 A | 7/1998 | Weisburn et al. |
| 5,788,068 A | 8/1998 | Fraser et al. |
| 5,799,784 A * | 9/1998 | Bosworth ................ 206/308.1 |
| 5,823,341 A | 10/1998 | Nakasuji |
| 5,829,582 A | 11/1998 | Ippolito et al. |
| 5,829,584 A | 11/1998 | Raucci, Jr. |
| 5,839,576 A | 11/1998 | Kim |
| 5,850,752 A | 12/1998 | Lax |
| 5,887,713 A | 3/1999 | Smith et al. |
| 5,890,590 A | 4/1999 | Doodson |
| 5,896,986 A | 4/1999 | Bolognia et al. |
| 5,899,327 A * | 5/1999 | Sykes ..................... 206/308.1 |
| 5,901,840 A | 5/1999 | Nakasuji |
| 5,904,246 A | 5/1999 | Weisburn et al. |
| 5,906,275 A | 5/1999 | Jokic |
| D411,071 S | 6/1999 | Cerda-Vicedo |
| 5,910,770 A | 6/1999 | Ohara |
| 5,931,291 A | 8/1999 | Sedon et al. |
| 5,931,294 A | 8/1999 | Weingarden et al. |
| 5,934,114 A * | 8/1999 | Weisburn et al. ............ 70/57.1 |
| 5,941,382 A | 8/1999 | Fantone et al. |
| 5,944,181 A | 8/1999 | Lau |
| 5,944,185 A | 8/1999 | Burdett et al. |
| 5,950,822 A | 9/1999 | Cloran et al. |
| 5,960,949 A | 10/1999 | Wynalda, Jr. |
| 5,975,298 A | 11/1999 | Sankey et al. |
| 5,984,388 A | 11/1999 | Bacon |
| 5,988,375 A * | 11/1999 | Chang .................... 206/308.1 |
| 5,988,376 A | 11/1999 | Lax |
| 5,996,788 A | 12/1999 | Belden, Jr. et al. |
| 5,996,815 A | 12/1999 | Walters et al. |
| 6,000,541 A | 12/1999 | Yu |
| 6,016,909 A * | 1/2000 | Chang ....................... 206/310 |
| D420,240 S | 2/2000 | Sorenson et al. |
| 6,021,894 A * | 2/2000 | Lakoski et al. .......... 206/308.1 |
| D422,445 S | 4/2000 | Markowitz |
| 6,047,821 A | 4/2000 | Hashimoto et al. |
| 6,056,117 A | 5/2000 | Courchesne |
| 6,059,102 A | 5/2000 | Gelardi et al. |
| 6,065,594 A | 5/2000 | Sankey et al. |
| D426,978 S | 6/2000 | Belden, Jr. et al. |
| 6,085,900 A | 7/2000 | Wong |
| 6,092,650 A | 7/2000 | Budnik |
| D430,424 S | 9/2000 | Belden, Jr. et al. |
| 6,119,857 A | 9/2000 | Stumpff |
| 6,123,192 A | 9/2000 | Rufo, Jr. |
| 6,135,280 A | 10/2000 | Burdett et al. |
| 6,164,445 A | 12/2000 | Cooper |
| 6,170,656 B1 | 1/2001 | Cerda-Vilaplana et al. |
| D437,520 S | 2/2001 | Choi |
| 6,196,384 B1 | 3/2001 | Belden, Jr. |

* cited by examiner

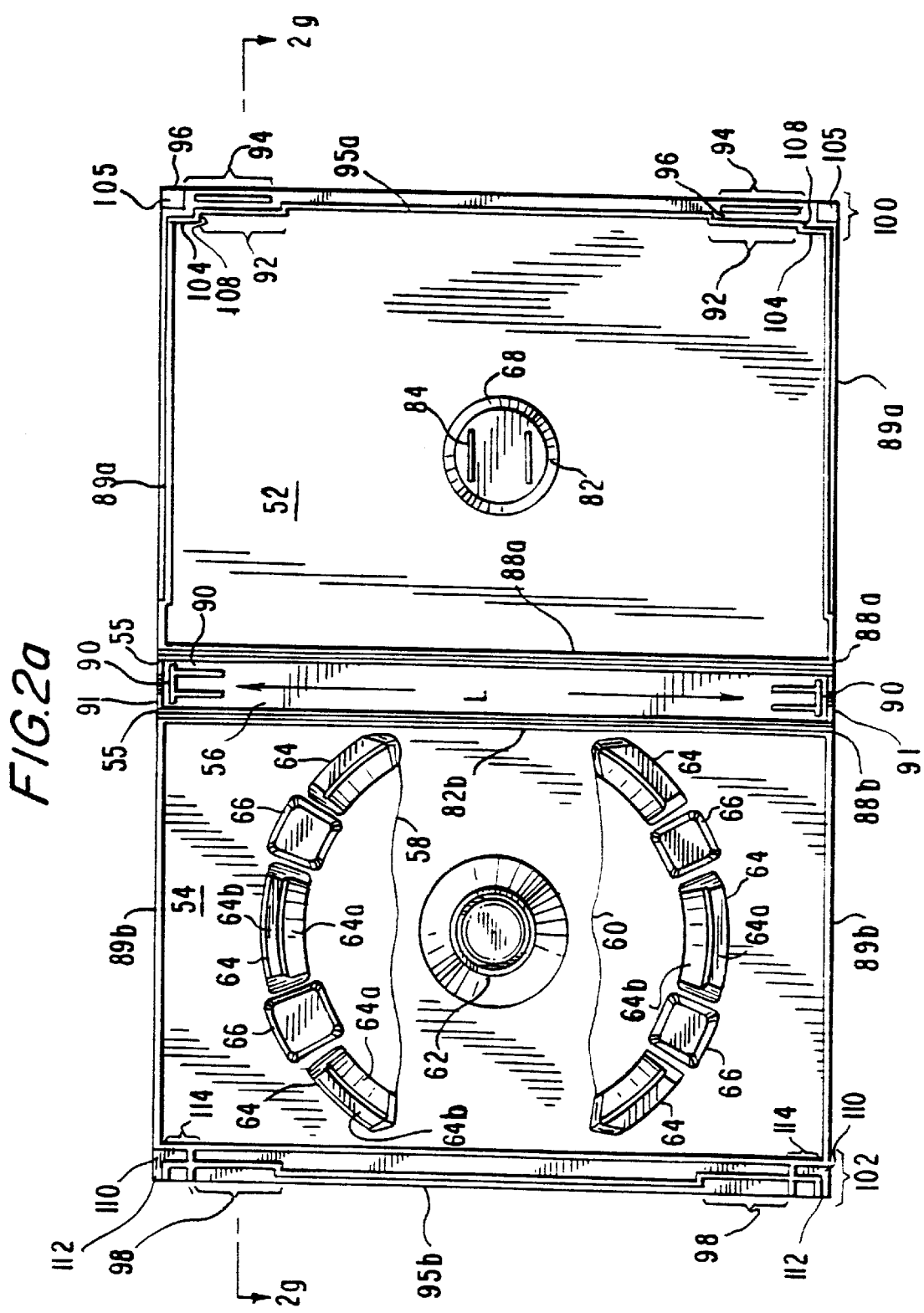

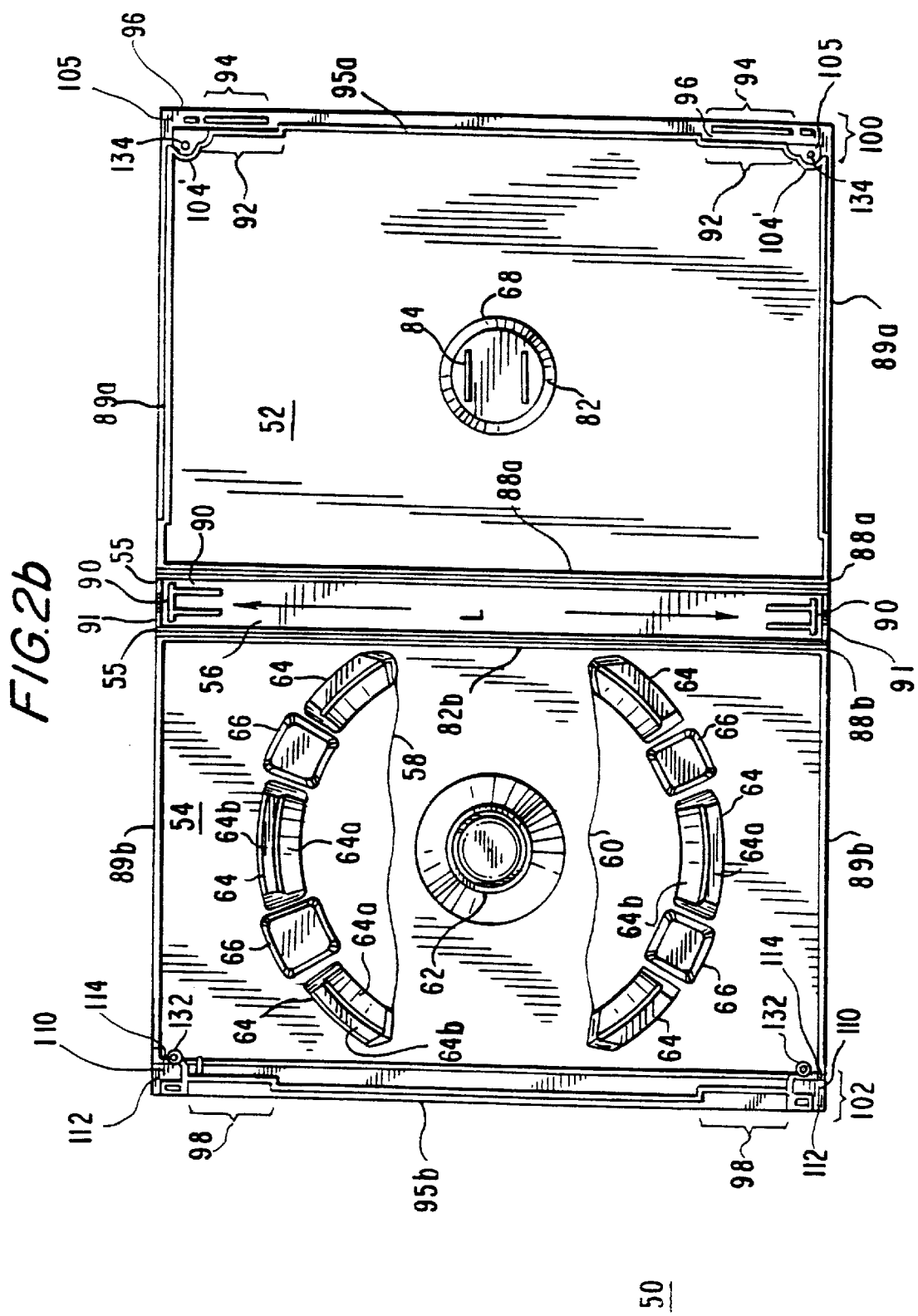

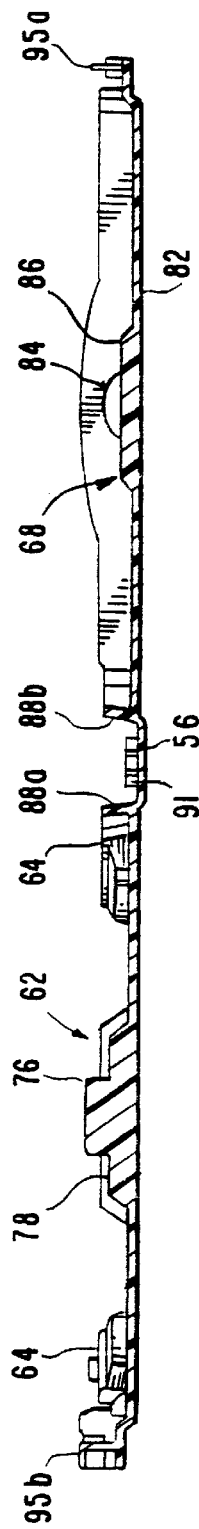
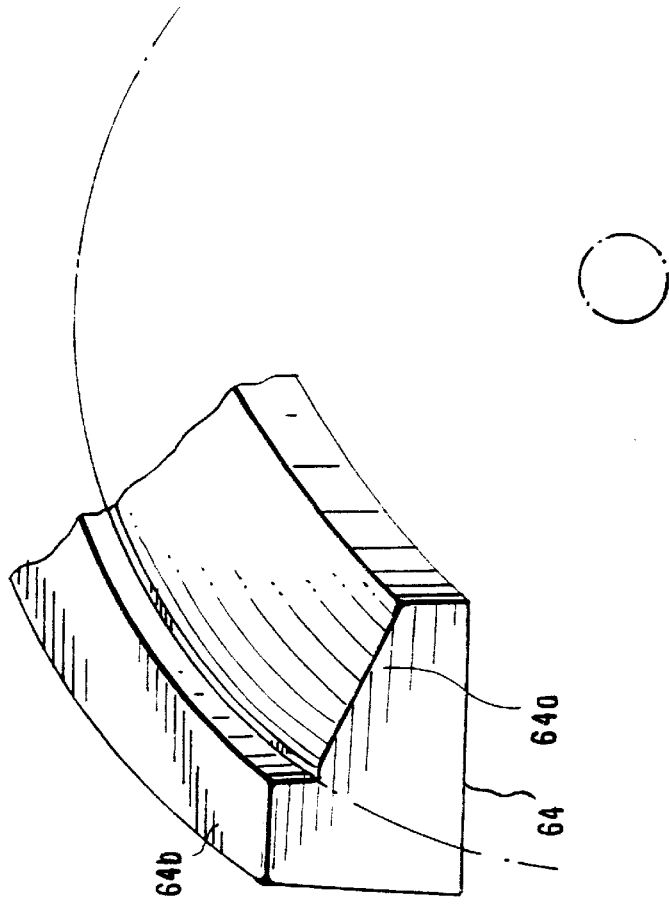

CASE AND LOCK WITH IMPROVED DISC PROTECTION

This application claims priority to provisional application No. 60/163,192 filed on Nov. 2, 1999.

BACKGROUND OF THE INVENTION

1. Field of the Invention

The present invention relates to a case and lock for storing and securing recording media and more particularly to a case and lock which protect recording media from theft and from being damaged during placement in and extrication from the case.

2. Description of the Related Art

Recording media ("disc") such as compact discs ("CDs") and digital video discs ("DVDs") typically have large amounts of digitally stored information that is optically readable through a transparent bottom layer of the disc by a movable head during rotation of the disc. The information is arranged in one or more tracks that are covered by a thin protective top layer of the disc that can have labeling applied thereto such as by silkscreening. Normal handling of the disc can result in scratching of the bottom layer, resulting in loss of data by interference with the optical path such as by loss of focus and/or lateral image displacement. Also, in the case of a DVD which includes stored information in dual layers, data can be lost if the disc is mishandled so as to cause the layers to split.

Protective storage cases are necessary to store and protect the recording media. Prior art storage cases typically comprise a first cover or door side, and a second cover or disc side. Each cover is pivotably coupled to a central spine portion to form what is referred to as a "living hinge." The living hinge allows the covers to pivot toward each other to close the case and encapsulate the disc. The storage cases are typically made of polypropylene which is known for its durability.

Protective storage cases in common use have a central pedestal located on the disc side for supportively gripping the disc by engaging the central opening without contacting either side of the disc within data-containing regions thereof. The central pedestal is typically a snap-in retention device which is made up of one or more spaced apart resilient elements arranged in a generally circular orientation. The resilient elements have one or more retainer portions that cause the pedestal to have a diameter greater than the diameter of the disc's central portion in the area of the retainer portions. The storage cases also typically have a ledge portion or portions for supporting the outer perimeter of the disc for stabilizing the disc against tipping on the pedestal.

In use, the disc, is loaded into the storage case by placing it onto the pedestal through the central opening, while resting on the perimeter portion. In the case of a snap-in retention device, the disc is secured to the pedestal portion by snapping the disc's central portion over the resilient elements of the pedestal, including the retainer portions, to secure the disc thereon. When the disc is placed over the resilient elements, and in particular the retainer portions, the resilient members bend inwardly, (toward the center of the central opening). Once the disc passes over the retainer portions, the resilient elements resume their original position. The disc is now locked on the pedestal, particularly by the retainer portions which partially extend over the outer edges of the central opening of the disc and prevent horizontal and vertical movement on the pedestal. Typically, the resilient elements are biased against the disc's center portion to keep it more securely fitted thereon.

The disc is removed from the pedestal by finger pressure against the pedestal portion. The finger pressure retracts the resilient elements towards the center of the central opening so that they no longer extend over the outer edges of the central opening, and they are no longer biased against the disc's center portion. The removal process is completed by simultaneous lifting of the disc at the perimeter portions. An example of one of these types of cases is disclosed in U.S. Pat. No. 5,944,181. Another is referred to as a"Warner" case, which typically stores DVD's distributed by Warner Bro. Another is referred to as an "Amaray-style" case, and yet another is referred to as an "Alpha" case. The Alpha case is similar to the above prior art cases except that disc removal is not effectuated by finger pressure. Instead, the user's fingers are guided under an edge portion of the disc to lift the disc off the pedestal.

The above prior art storage cases have a number of disadvantages. One disadvantage is that the pedestal portions resilient fingers put a stress on the disc. This could damage the disc. Another disadvantage is that the user will frequently try to remove the disc without exerting finger pressure against the pedestal portion. Instead, the user will grasp an edge of the disc (as in the Alpha case) and use the pedestal as a pivot to rotate the disc off the pedestal hub. Such a rotation may cause the disc to bend or even break. Such bending is unacceptable because the bending could damage the data stored on the disc. In the case of a DVD, the bending could cause the layers to split.

Another disadvantage of prior art storage cases is that there is no effective means of securing the disc inside the storage case against theft. This is a particular disadvantage in the live rental and retail industry where the respective renter or purchaser has access to a storage case containing a disc. For example, if a security tag is placed on a shrink-wrapped storage case for retail sale, a thief could simply open the package and remove the disc. And, even if the storage case is locked so that the case cannot be opened, a thief can still gain access to the disc by simply cutting the living hinge.

Therefore, there exists a need in the art for a storage case to solve the aforementioned problems. Particularly, there exists a need for a storage case which allows for easy storage and safe, stress-free removal of a disc. There also exists a need for a storage case which can provide increased security (on a retail or live rental level) for a disc stored therein.

SUMMARY OF THE INVENTION

It has been found that the above disadvantages have been overcome in a storage case for storing a recording medium having an opening with an opening width. The storage case comprises a first cover, the first cover including a seating area to seat the recording medium. A second cover is hingedly coupled to the first cover, the first and second covers capable of moving from a open position to a closed position whereby the second cover is placed over the first cover to restrict access to the seating area. A hub is disposed upon and extends upwardly from the first cover to receive the recording medium opening when the recording medium sits on the seating portion. The hub has a maximum external width which is less than or equal to the opening width.

One important feature of this aspect is to further comprise a hub coupling member disposed on the second cover, the hub coupling member including at least one projection extending from the second cover.

Another aspect of the invention is a storage case comprising a first cover and a second cover coupled to the first cover. At least one projection extends from the first cover. The at least one projection includes a first projection extending to a first projection height with respect to the first cover and a second projection extending to a second projection height with respect to the first cover. A circle drawn connecting all of the first projections has a first diameter. A circle drawn connecting all of the second projections has a second diameter. The second diameter is larger than the first diameter.

Yet another aspect of the invention is a storage case comprising a first cover and a second cover coupled to the first cover. At least a first and second projection extend from said first cover. The first and second projections each include a lower projection extending to a first projection height with respect to the first cover and a higher projection extending to a second projection height with respect to the first cover. The first projection height is lower than, the second projection height. A distance between lower projections of the first and second projections is smaller than a distance between higher projections of the first and second projections.

Still yet another aspect of the invention is a storage case for storing a storage medium. The storage case comprises a first cover and a second cover. A hub is disposed on the first cover, the hub being effective to receive the storage medium. The first cover includes a first lock portion. The second cover includes a second lock portion. The first and second lock portions are disposed inwardly from the first and second covers respectively, whereby a width of a combination of the first and second covers is wider than a width of a combination of the first and second lock portions.

Yet still another aspect of the invention is a storage case for storing a recording medium. The storage case comprises a first cover, a second cover, and a spine coupling the first and second cover together. The spine has a length and a width. A hub is disposed on the first cover, the hub is effective to receive the storage medium. The first cover includes a first side wall extending upwardly therefrom and having a first height. The second cover includes a second side wall extending upwardly therefrom and having a second height. A sum of the first and second height is approximately equal to the width of the spine.

These aspects and advantages of the present invention, as well as others, will become apparent from the following description of the preferred embodiments which refers to the accompanying drawings.

BRIEF DESCRIPTION OF THE DRAWINGS

For the purpose of illustrating the invention, there is shown in the drawings an embodiment which is presently preferred; it being understood, however, that the invention is not limited to the precise arrangements and instrumentalities shown.

FIG. 2a is a plan view of an open storage case of the present invention;

FIG. 2b is a plan view of another embodiment of an open storage case of the invention;

FIG. 2c is an enlarged view of a bottom closing section of the bottom cover of the storage case shown in FIG. 2a;

FIG. 2d is an enlarged view of a top closing section of the top cover of the storage case shown in FIG. 2a;

FIG. 2g is a cross-sectional view of the storage case of FIG. 2b taken along the lines 2g—2g;

FIG. 3 is a perspective view of a foot disposed on a bottom cover of the storage case of the present invention;

FIG. 7 is a side view of the open storage case of FIG. 2a;

FIG. 8 is a bottom view of the open storage case of FIG. 2a;

FIG. 9b is a top view of the lock shown in FIG. 9a;

DETAILED DESCRIPTION OF THE PREFERRED EMBODIMENT(S)

Figure 1:
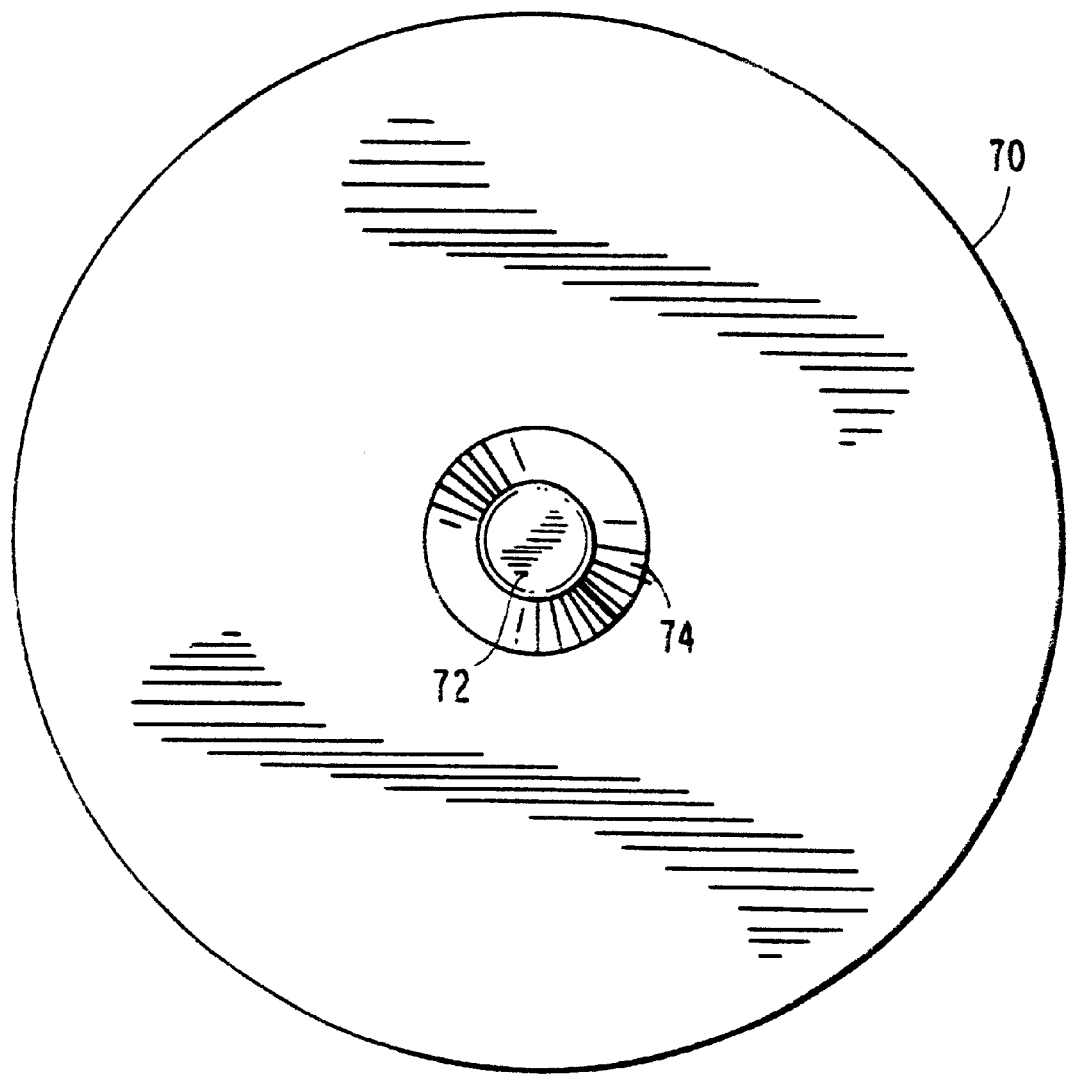
FIG. 1 is a plan view of a recording medium which can be used with the present invention.

FIG. 1 shows a typical recording medium or disc 70 which can be used with the storage case of the present invention. Exemplary recording media are DVDs and CDs although it is within the scope of the present invention to be used in connection with any other type of recording media. Recording medium 70 includes a circular opening 72 disposed in a central portion thereof. Towards the center of recording medium 70, and external to opening 72, is an unused portion 74 where data is purposefully not recorded on the recording medium.

Figure 2D:
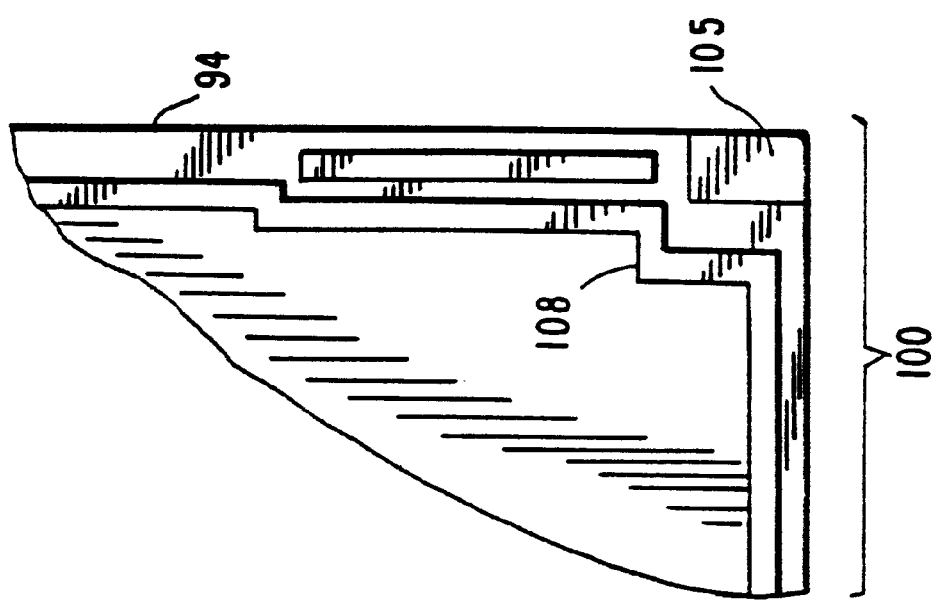
Figure 2C:
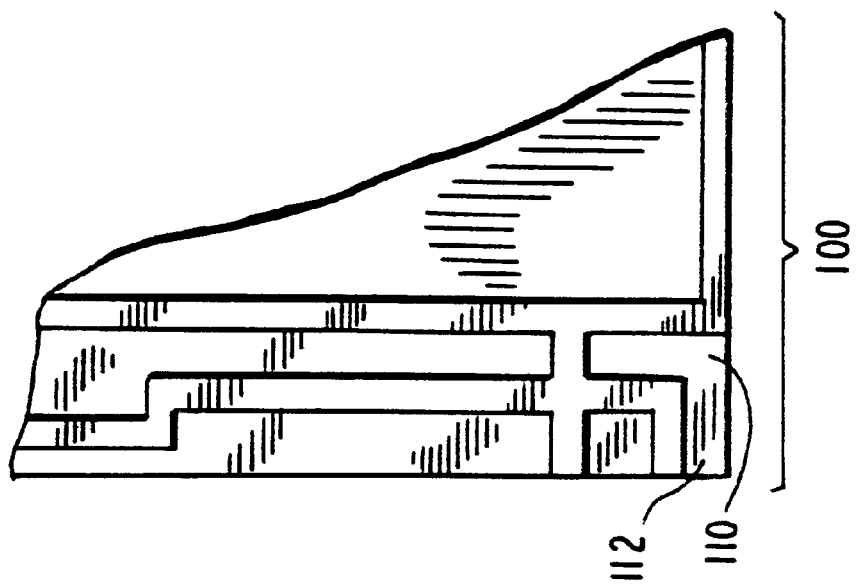

Referring to FIG. 2a, there is shown a plan view of an open case 50 in accordance with the present invention. Case 50 can be made by any methods out of any of the known materials. Preferably, case 50 is made of polypropylene.

Storage case 50 comprises a top cover or door side 52, a bottom cover or disc side 54, and a spine 56 disposed therebetween. Bottom cover 54 receives and retains recording medium 70. Top cover 52 and bottom cover 54 are pivotably coupled to spine 56 at respective pivot points 55 to form what is referred to as "living hinge." The living hinge allows top and bottom covers 52, 54 to be rotated toward each other about pivot points 55 so that top and bottom cover 52, 54 can meet and mate with each other to enclose and, therefore, store and protect recording medium 70.

Bottom cover 54 includes a hub 62 to receive recording medium 70 through opening 72 and seat and secure recording medium 70 thereon. Hub 62 allows for storage and removal of recording medium 70 in storage case 50 in a safe, easy way, without putting any stress on recording medium 70.

Figure 4:
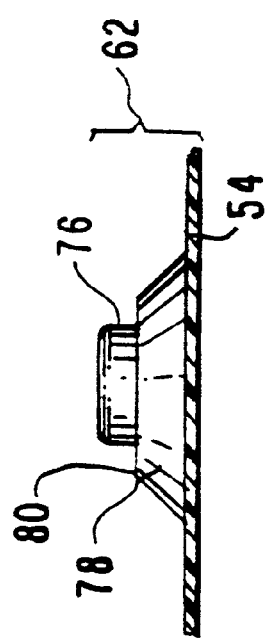
FIG. 4 is side view of a hub of the present invention.
Figure 6:
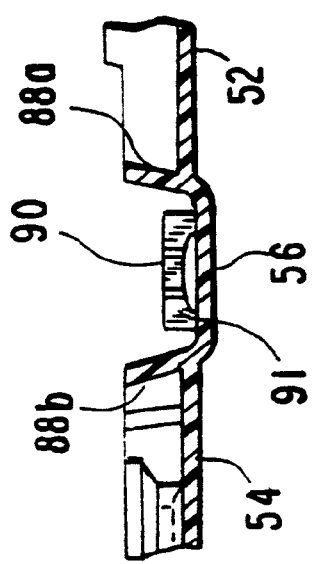
FIG. 6 is a partial cross-sectional view of a spine and side walls of the storage case of the present invention.

Referring to FIGS. 2a, 2b and 4, hub 62 has a smooth external surface and is comprised of a cylinder or stump 76 which prevents lateral movement of recording medium 70 while it is disposed thereon. Cylinder 76 is disposed upon a support in the form of a frustum shaped member 78. Frustum shaped member 78 has a diameter 80 on a flat upper portion thereof which is larger than the diameter of opening 72 on recording medium 70, but smaller than the diameter of unused portion 74. Clearly, other shapes (e.g. a cylinder, cone, rectangular solid, etc.) could be used as frustum shaped member 78 as long as the maximum external width of the support is greater than the diameter of opening 72. When a user places recording medium 70 on hub 62, cylinder 76 passes through opening 72 and unused portion 74 rests on frustum shaped member 78.

Cylinder 76 should be sized so that it imparts little or no stress on recording medium 70, and allows recording medium 70 to be easily and safely removed from cylinder 72 with little or no stress on the medium. In this way, a user can place and remove recording medium 70 on hub 62 without bending and/or damaging recording medium 70. This is particularly important for the storage of a DVD which includes layers of recorded information. If the DVD is bent, such bending could cause damage to the DVD by inadvertent separation of the DVDs layers.

Preferably, cylinder 76 has an outer diameter (or maximum external width) which is less than or equal to the diameter of opening 72 of medium 70 to allow cylinder 76 to receive medium 70 through opening 72. Preferably, the outer surface of cylinder 76 should be smooth. Clearly, other shapes instead of a cylinder could be used as cylinder 76 as long as the maximum external width is less than or equal to the diameter of inner opening 72.

In order to prevent recording medium 70 from tipping off of hub 62, bottom cover 54 includes upper holding portions 58 and lower holding portions 60. These portions support outer edge portions of recording medium 70 when disposed on hub 62. Bottom cover 54 includes upper holding portion 58 arranged in a semi-circle about hub 62 and lower holding portion 60 disposed symmetric to upper holding portion 58 with respect to hub 62.

Referring now also to FIG. 3, both upper and lower holding portions 58, 60, are comprised of a plurality (three are shown in the figures) of arcuate shaped feet 64 separated by recesses 66. Each foot 64 is comprised of a protrusion having an L-shaped cross-section including a first protrusion 64a which extends upwardly from bottom cover 54 to a height which is lower than a height of a second protrusion 64b which also extends upwardly from bottom over 54.

Feet 64 are arranged on bottom cover 54 to follow the general contour of recording medium 70. In this way, the outer edges of recording medium 70 are caused to rest on feet 64. In FIG. 2a, for example, feet 64 are arranged to follow the circular contour of a round recording medium such as a DVD. A first circle having a first diameter can be formed by connecting the tops of first protrusions 64a and a second circle having a second diameter larger than the first diameter can be formed by connecting the tops of second protrusions 64b. The diameter of the first circle (with first protrusions 64a) is further smaller than the diameter of recording medium 70. In contrast, the diameter of the second circle (with second protrusions 64b) is larger than the diameter of recording medium 70. In this way, outer edges of recording medium 70 can be placed on protrusions 64a (and frustum 78) and kept in place by protrusions 64b. Clearly, feet 64 do not have to be arcuate in shape. They can, for example, extend in a straight line as long as the distance between second protrusions 64b disposed on opposite sides of hub 62 is greater than the diameter of recording medium 70; and the distance between first projections 64a disposed on opposite sides of hub 62 is less than the, diameter of recording medium 70.

Feet 64 are spaced and arranged so that a user wishing to store or remove recording medium 70 from storage case 50 can grasp the circumferential edge of recording medium 70 using a plurality of his or her fingers without interference from feet 64. Recesses 66 are provided in between feet 64 to provide space for the user's fingers so that a user's fingers can engage the circumferential edge of recording medium 70 throughout the placement and removal of recording medium 70 from storage case 50.

Figure 5:
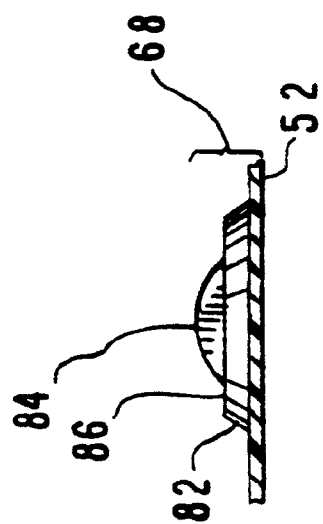
FIG. 5 is a side view of a hub coupling member of the present invention.

Referring again to FIGS. 2a, 2b and now also to FIG. 5, in order to prevent recording medium 70 from moving along cylinder 76 when storage case 50 is closed, a hub coupling member 68 is disposed on a portion of top cover 52. Hub coupling member 68 mates with hub 62 when top cover 52 and bottom cover 54 are closed on each other.

Hub coupling member 68 includes a plurality of crescents 84 (preferably two) extending from a frustum shaped portion 82. Frustum shaped portion 82 has an upper diameter 86 which is larger than the diameter of opening 72, but smaller than the diameter of unused portion 74 of recording medium 70 (FIG. 1). Crescents 84 are disposed a distance from each other that is slightly larger than the outside diameter of cylinder 76, and positioned so they extend on opposite sides of hub 62. In this way, crescents 84 act as a guide to receive cylinder 76 so that storage case 50 is closed properly. Preferably, crescents 84 are sized so that they gently contact recording medium 70 on unused portion 74 when case 50, is closed. This inhibits vertical movement of recording medium 70 on cylinder 76 while recording medium 70 is stored in storage case 50. Because crescents 84 contact unused portion 74, the crescents cannot damage the recording medium.

Referring again to FIGS. 2a, 2b and now also to FIGS. 2g, 6, 12 and 13, top and bottom covers 52, 54 include security features which prevent thieves from gaining access to medium 70 through spine 56 when storage case 50 is closed (and locked, e.g., using the locking mechanism described below). The first security feature includes side walls 88a and 88b which extend along the length of spine 56 and have a height which is approximately equal to half the width of spine 56.

The second security feature includes "pi" shaped reinforcing members 90 located on opposite ends of spine 56 and extending upwardly therefrom. Reinforcing members 90 are comprised of a first portion extending perpendicularly to a longitudinal axis L of spine 56 and two portions extending in parallel with a longitudinal axis L of spine 56.

A third security feature of storage case 50 is the provision of semi-circular shaped spinal projections 91. Spinal projections 91 are disposed at opposing ends of spine 56 and extend upwardly from spine 56 in a direction that is substantially perpendicular to longitudinal axis L.

When storage case 50 is closed (and locked as explained below), side walls 88a, 88b, reinforcing member 90, and spinal projections 91 prevent thieves from gaining access to recording medium 70 by simply cutting spine 56 along its edges (i.e. pivot points 55). When top and bottom covers 52, 54 are closed together, side walls 88a and 88b meet and form a second wall (not explicitly shown but best understood with reference to FIG. 13) disposed parallel to and internal of spine 56. If a thief, therefore, cuts spine 56, the second wall prevents access to storage medium 70.

Reinforcing members 90 and spinal projections 91 provide further protection. If a thief were to try to cut spine 56 either horizontally or vertically in the area of either reinforcement members 90 or spinal projections 91, he or she would meet resistance due to the thickness of spine 56 being effectively increased due to the presence of reinforcing members 90 and spinal projections 91.

Referring to FIGS. 2a and 2b, still yet another security feature of storage case 50 is the provision of top and bottom closing walls. A top closing wall 95a is provided on top cover 52 and a bottom closing wall 95b is provided on bottom cover 54. Both top and bottom closing walls 95a, 95b extend in a direction which is substantially parallel to the longitudinal axis L of spine 56. Top closing wall 95a is disposed at a distance from spine 56 on top cover 52 that is smaller than the distance between bottom closing wall 95b to spine 56 on bottom cover 54. In this way, when storage case 50 is closed, top closing wall 95a sits behind top closing wall 95b. This yields a double wall between the exterior of storage case 50 and a recording medium disposed on hub 62.

Figure 12:
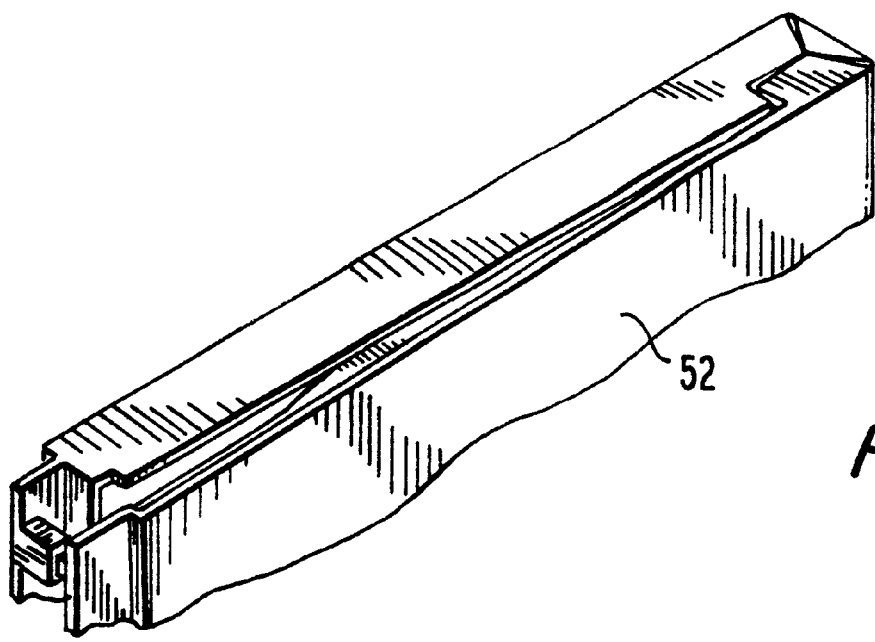
FIG. 12 is a perspective view of a mostly closed storage case in accordance with the invention.
Figure 13:
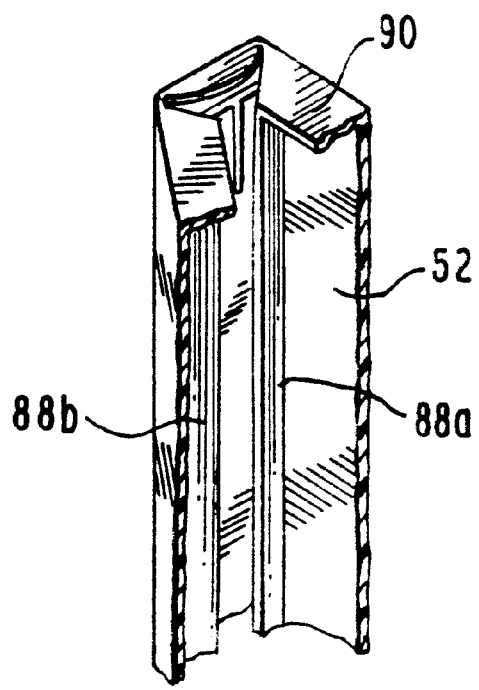
FIG. 13 is a perspective cut-away view of a mostly closed storage case in accordance with the invention.

Similarly, referring also to FIG. 12 top cover 52 further includes top side walls 89a disposed on either ends of top cover 52. Bottom cover 54 includes bottom side walls 89b disposed on either ends of bottom cover 54. All of top and bottom side walls 89a, 89b, extend substantially perpendicular to the longitudinal axis L of spine 56. As with top closing wall 95a, top side walls 89a are disposed at a distance from hub coupling member 68 that is smaller than the distance between bottom side walls 89b and hub 62. In this way, when top cover 52 is closed upon bottom cover 54, top side walls 89a sit behind bottom side walls 89b. Again, this yields a double wall between the exterior of storage case 50 and a recording medium disposed on hub 62.

Figure 7:
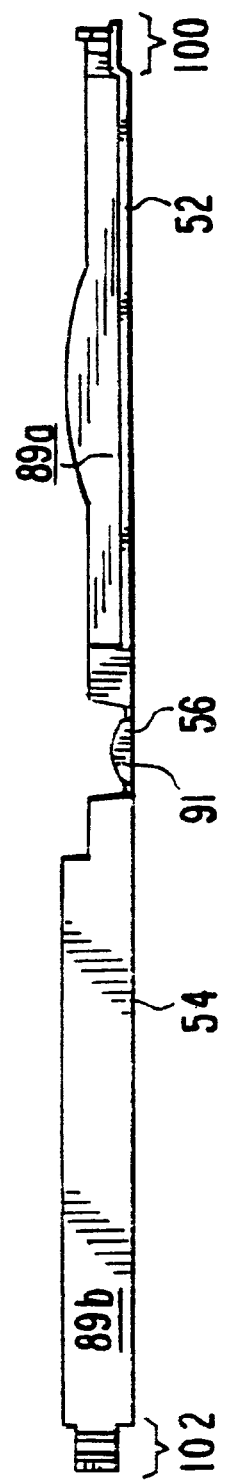
Figure 8:
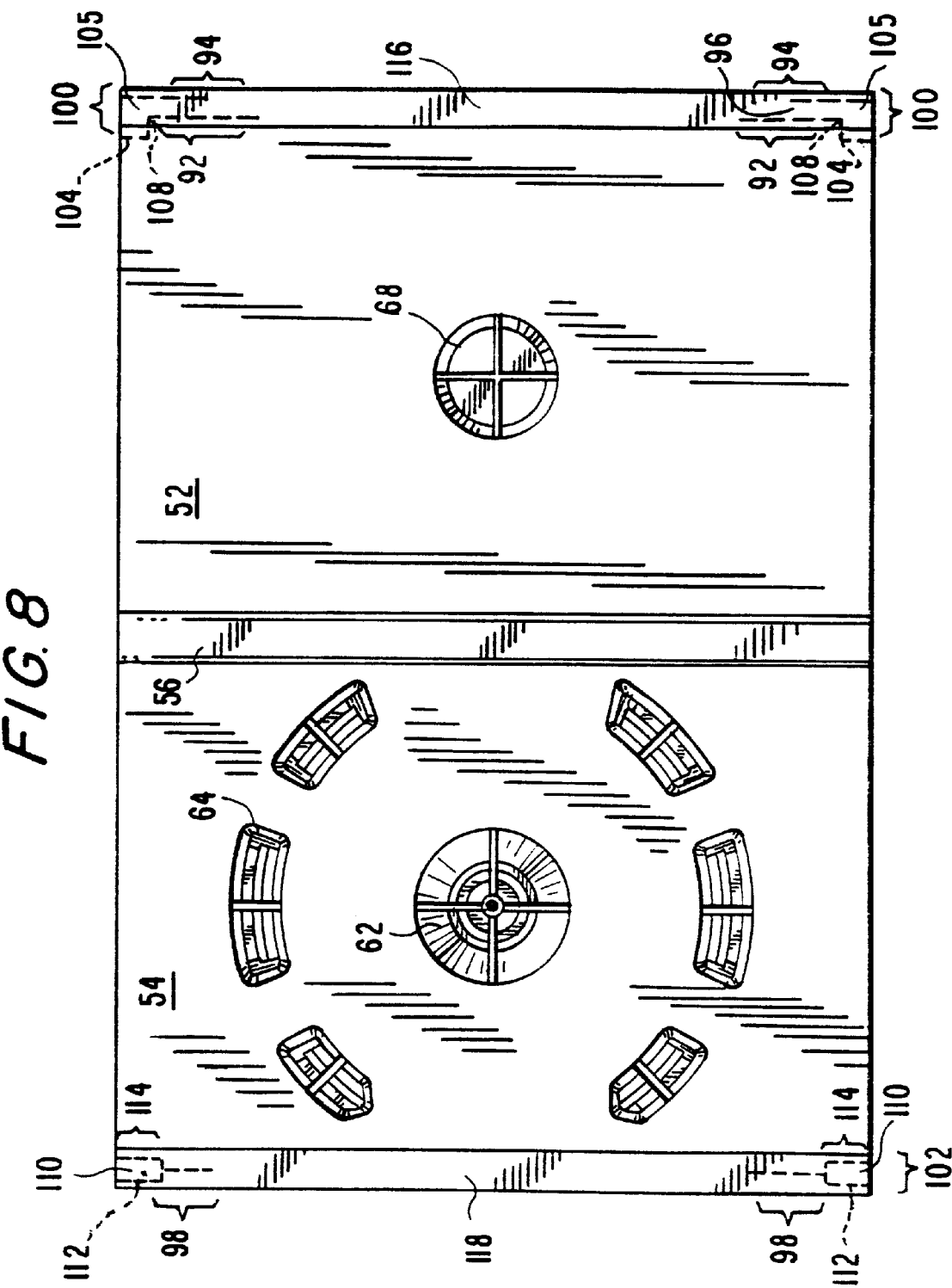

In the rental and retail recording medium industry, shelf space is at a premium. It is desirable, therefore, that case 50 be as thin as possible, particularly when used with a security device such as a locking mechanism or lock 120. Referring now to FIGS. 7 and 8, to achieve this size objective, top and bottom covers 52, 54 include respective top and bottom closing sections 100, 102 extending therefrom. Top and bottom closing sections 100, 102 are stepped in or recessed inwardly toward the inner portion of case 50. When case 50 is closed, therefore, closing sections 100, 102 are constructed and arranged to form an extension portion 103 of reduced thickness to engage locking mechanism 120, FIG. 10. In other words, top and bottom closing sections 100, 102 have a combined width (extension portion 103) that is thinner than the width of case 50 when case 50 is closed. Specifically, when top cover 52 is closed on bottom cover 54, since top and bottom closing sections 100, 102 are recessed inwardly towards the inner portion of case 50, the overall width of storage case 50 while closed (i.e. the combined width of top and bottom covers 52, 54 or approximately the width of spine 56) is thicker than the width of the combined top and bottom closing sections 100, 102 (extension portion 103).

Locking mechanism 120 (FIGS. 9a, 9b) engages extension portion 103 by overlapping such portion 103 (which is discussed more completely below). This allows lock 120 to be disposed flush with the sides of storage case 50. As a result, the overall thickness of the storage case does not increase when lock 120 is used.

Locking mechanism 120 (FIGS. 9a–11), when engaged with storage case 50, prevents the case from being opened when recording medium 70 is placed therein. This type of arrangement is particularly useful in the live rental or retail industry where, for example, one would not want the public to gain access to recording medium 70 until rental or purchasing fees have been paid. Similarly, lock 120 can be embedded with a security device which would set off a buzzer or alarm if a would be renter or purchaser of recording medium 70 tried to leave a store with lock 120 still on storage case 50. Preferably, lock 120 used with storage case 50 is as shown and described in U.S. Pat. Nos. 5,598,728; 5,850,752; and 5,988,376 all assigned to Autronic Plastics, Inc. The entirety of these documents is hereby incorporated by reference herein.

Referring now to FIGS. 2a, 2c, 2d, 10 and 11, to further achieve the size objective, top cover 52 further comprises first top closing projections 92 disposed at opposite ends of top cover 52 in top closing section 100. Top closing section 100 also includes second top closing projections 94 disposed in parallel with first top closing projections 92 and having sides which face an outside of storage case 50. First top closing projections 92 and second top closing projections 94 define top closing recesses 96 therebetween. Bottom cover 54 includes bottom closing projections 98 disposed at opposite ends of bottom cover 54 in bottom closing section 102. When top cover 52 is closed on bottom cover 54, bottom closing projection 98 mates with recess 96.

Storage case 50 is designed so that it can efficiently be combined with lock 120 and lock case 50 as securely as possible. Top closing section 100 of top cover 52, further includes connecting protrusions 108 which connect first top closing portions 92 to top recess defining protrusions 104. First and second top closing portions 92, 94, connecting protrusions 108, and top recess defining protrusions 104 all extend from wall portions 105 located at opposite ends of top closing section 100. As described below, wall portions 105 define openings to receive hook portions of lock 120.

Figure 9A:
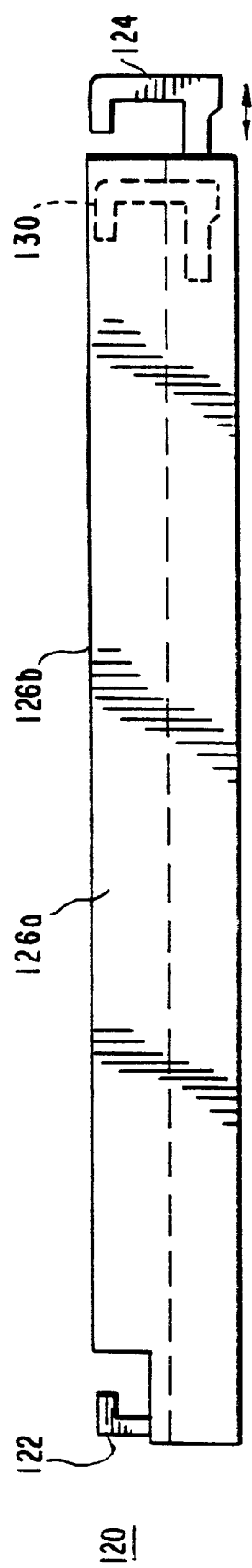
FIG. 9a is a side view of a lock which can be used with the storage case of the present invention.
Figure 9B:
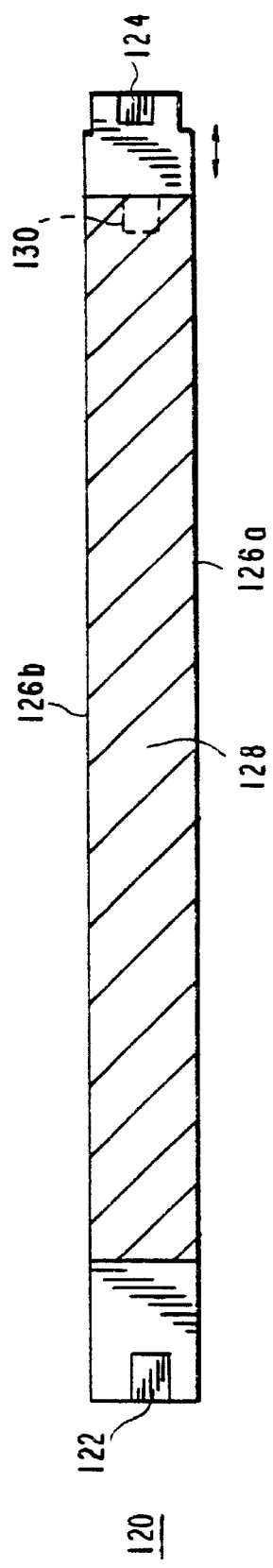

Bottom closing section 102 of bottom cover 54 further includes hook receiving portions 114 integral with bottom closing projections 98. A wall member 112 is disposed under each hook receiving portion 114. When case 50 is closed, hook receiving portions 114, wall portions 105, and wall portions 112 define hook receiving openings 110 at distal ends of extension portion 103 to receive and engage hook portions of lock 120 (FIGS. 9a, 9b).

To facilitate the engagement of top cover 52 with bottom cover 54 when storage case 50 is to be closed, the internal surface of hook members 114 are shaped to match the external surface of top recess defining protrusions 104 (on top cover 52) and connecting protrusions 108 (also on top cover 52). Top recess defining portions 104 and connecting protrusions 108 are also disposed slightly further inward (i.e. toward the center of storage case 50) than hook portions 114.

The closing of storage case 50 and the application of lock 120 will now be described. Referring now also to FIG. 8, top closing section 100 and bottom closing section 102 further include a top surface 116 and a bottom surface 118, respectively. When top cover 52 is closed on bottom cover 54, top recess defining protrusions 104 and connecting protrusions 108 are placed internal to and mesh with hook portions 114. Top closing section 100 and bottom closing section 102 meet to form extension portion 103 and, thereby, provide a smooth level surface for lock 120 (FIGS. 9a, 9b) to be applied thereto. Again, extension portion 103 has a thinner width than the combined width of top and bottom covers 52, 54.

Figure 2F:
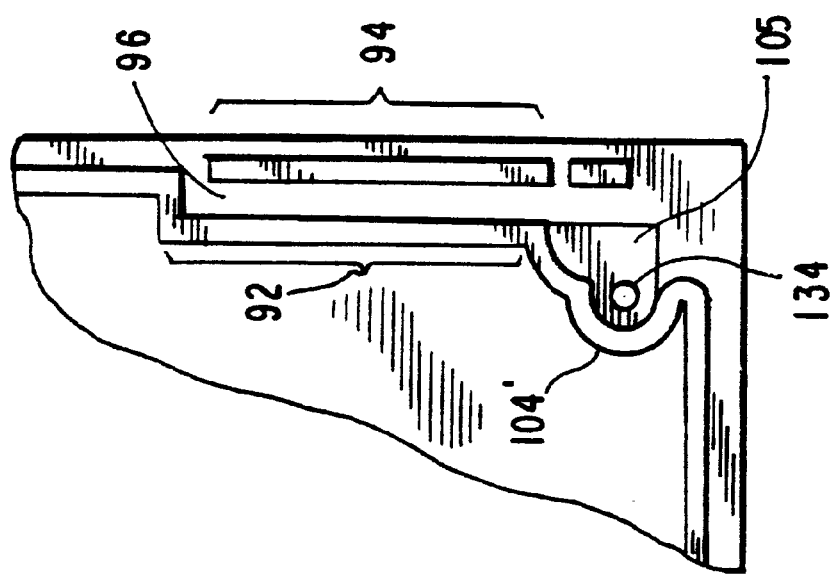
FIG. 2f is an enlarged view of a top closing section of the top cover of the storage case shown in FIG. 2b.
Figure 2E:
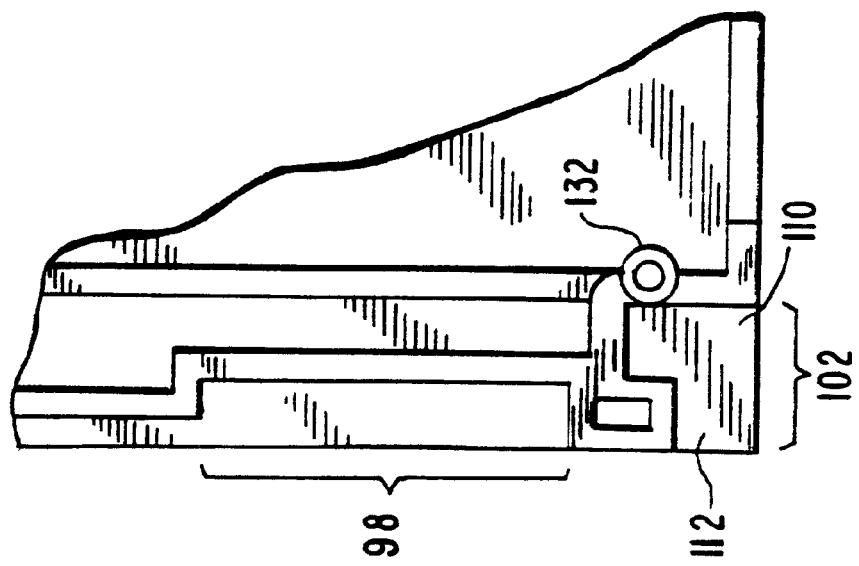
FIG. 2e is an enlarged view of a bottom closing section of the bottom cover of the storage case shown in FIG. 2b.

An alternative embodiment of storage case 50 is shown in FIGS. 2b, 2e and 2f where like reference numerals refer to like elements and a description of such elements is omitted for the sake of brevity. In FIG. 2b, an additional structure is added to enhance the mating of top cover 52 with bottom cover 54. A cylindrical tube 132 is disposed internally of hook portion 114 and extends upwardly on bottom cover 54. A substantially arcuate top recess defining protrusion 104 is disposed on top cover 52 so that when top cover 52 is closed upon bottom cover 54, top recess defining protrusion 104' fits internally to cylindrical tube 132. A cylindrical post 134 is disposed internal to top recess defining protrusion 104' and extends upwardly from top cover 52. Cylindrical post 134 is disposed on top cover 52 so that when top cover 52 is closed upon bottom cover 54, cylindrical post 134 mates with cylindrical tube 132. In this way, cylindrical post 134, and cylindrical tube 132 provide an additional mating engagement between top cover 52 and bottom cover 54. Finally, a mating protrusion 136 is disposed on top cover 52 so that it can mate with a mating recess 138 disposed on bottom cover 54 when the covers 52, 54 are closed. Both mating protrusion 136 and mating recess 138 have a substantially rectangular cross-section.

Referring now to FIGS. 9a and 9b, a lock shown generally at 120, can be used in conjunction with storage case 50. The operation of lock 120 with case 50 is generally shown and described in the Autronic Plastic's patents referenced above. Preferably, lock 120 includes a fixedly mounted hook member 122 disposed on one end and a moveably mounted hook member 124 disposed at another end. In between hook members 122, 124 are walls 126a and 126b disposed on opposing sides of lock 120 and in parallel with each other. As can be seen most clearly in FIG. 9b, walls 126a, 126b do not extend the entire length of lock 120. Walls 126a, 126b define a cavity 128 which is to receive extension portion 103 of storage case 50 therein.

Figure 10:
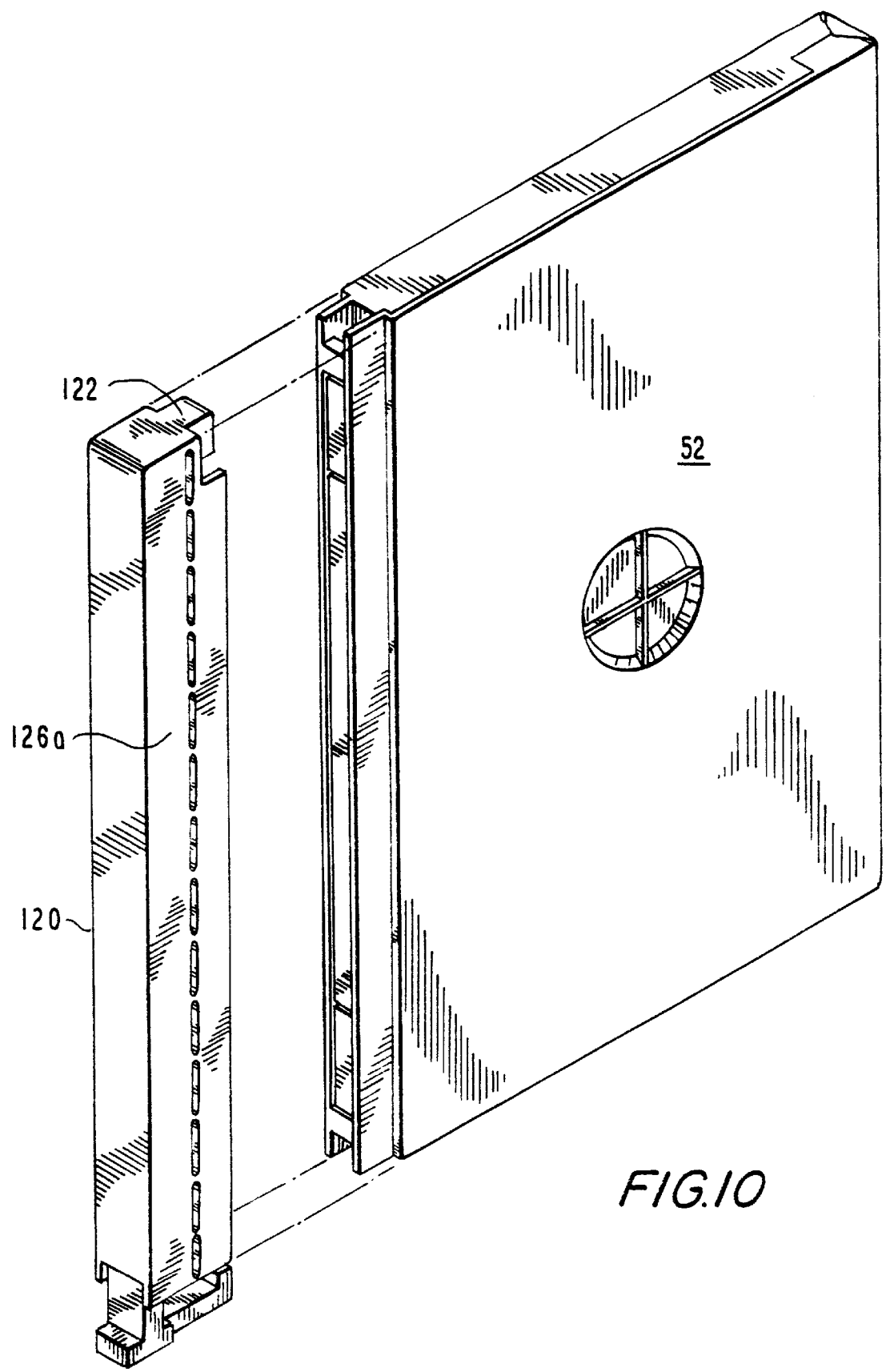
FIG. 10 is a perspective view of the lock of FIG. 9a about to be secured to a closed storage case of the present invention.

Referring also to FIG. 10, when lock 120 is to be applied to storage case 50, storage case 5o is closed as was described above. Extension portion 103 is placed within cavity 128 so that wall 126a is aligned adjacent to top surface 116 and wall 126b is aligned adjacent to bottom surface 118. One of the openings 110 is then mated with hook member 122. Movably mounted hook member 124 is moved to a retracted position 130 where hook member 124 mates with the other one of openings 110. Alternatively, one of openings 110 is mated with hook member 124. Then, extension portion 103 is inserted between walls 126a, 126b. Hook member 124, along with storage case 50 is then slid toward hook member 122 until the other opening 110 mates with hook member 122, and hook member 124 is retracted to position 130. In this way, hooks 122, 124 wrap around the ends of storage case 50 and lock the case closed.

Figure 11:
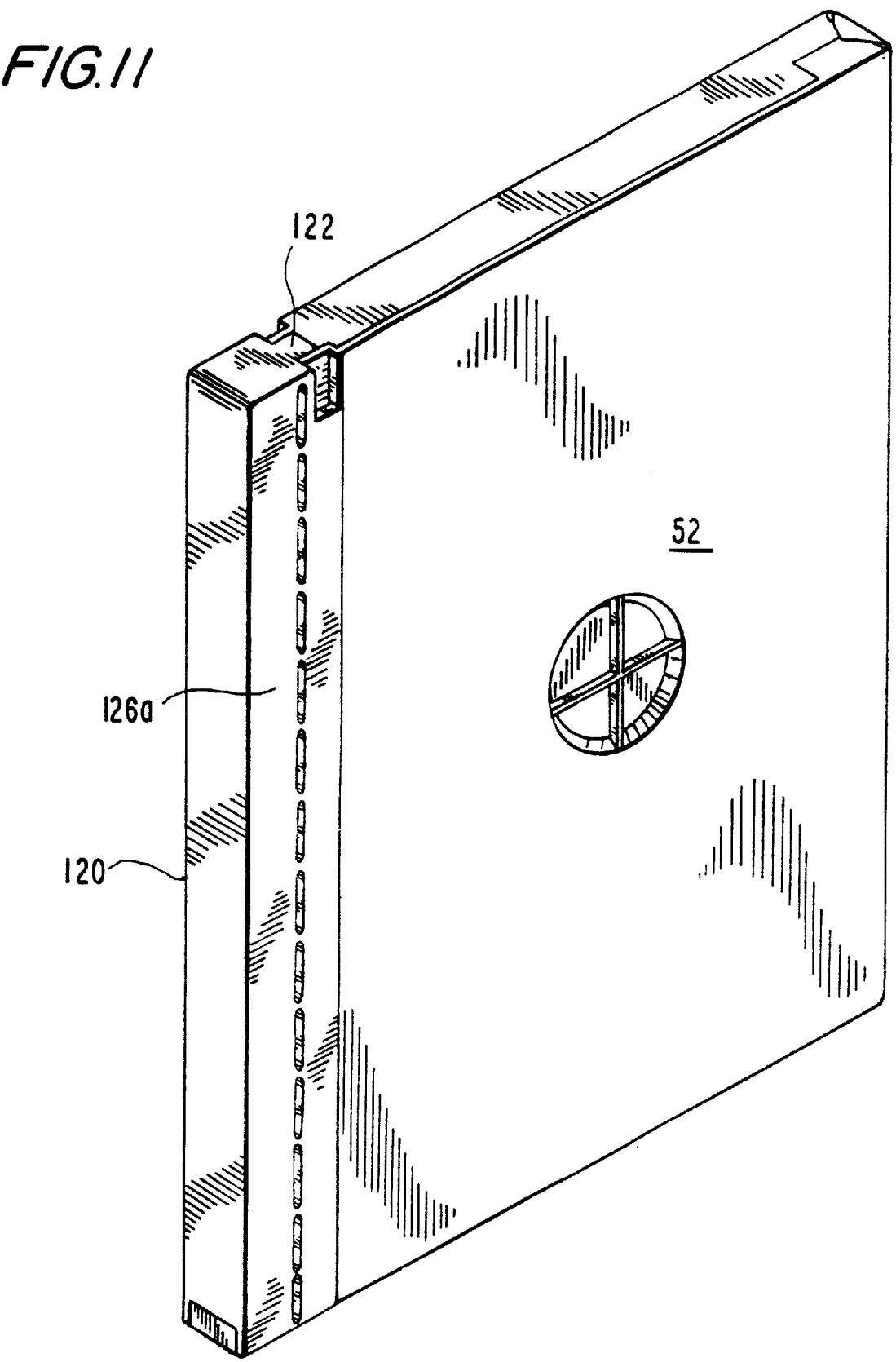
FIG. 11 is a perspective view of the lock of FIG. 9a secured to a closed storage case of the present invention.

As can be seen most clearly in FIG. 11, lock 120 securely locks case 50 closed by wrapping around, and securely locking, case 50 on four sides, i.e., with hooks 122, 124 and walls 126a, 126b.

Moreover, the width of lock case 50 is not increased by engaging lock 120. The width of lock 120 is designed to be equal to the distance (or width) between closed top cover 52 and bottom cover 54 (approximately equal to the width of spine 56) but larger than the width of extension portion 103. In this way, when lock 120 is engaged with storage case 50, walls 126a and 126b sit flush with the sides of storage case 50.

Figure 14:
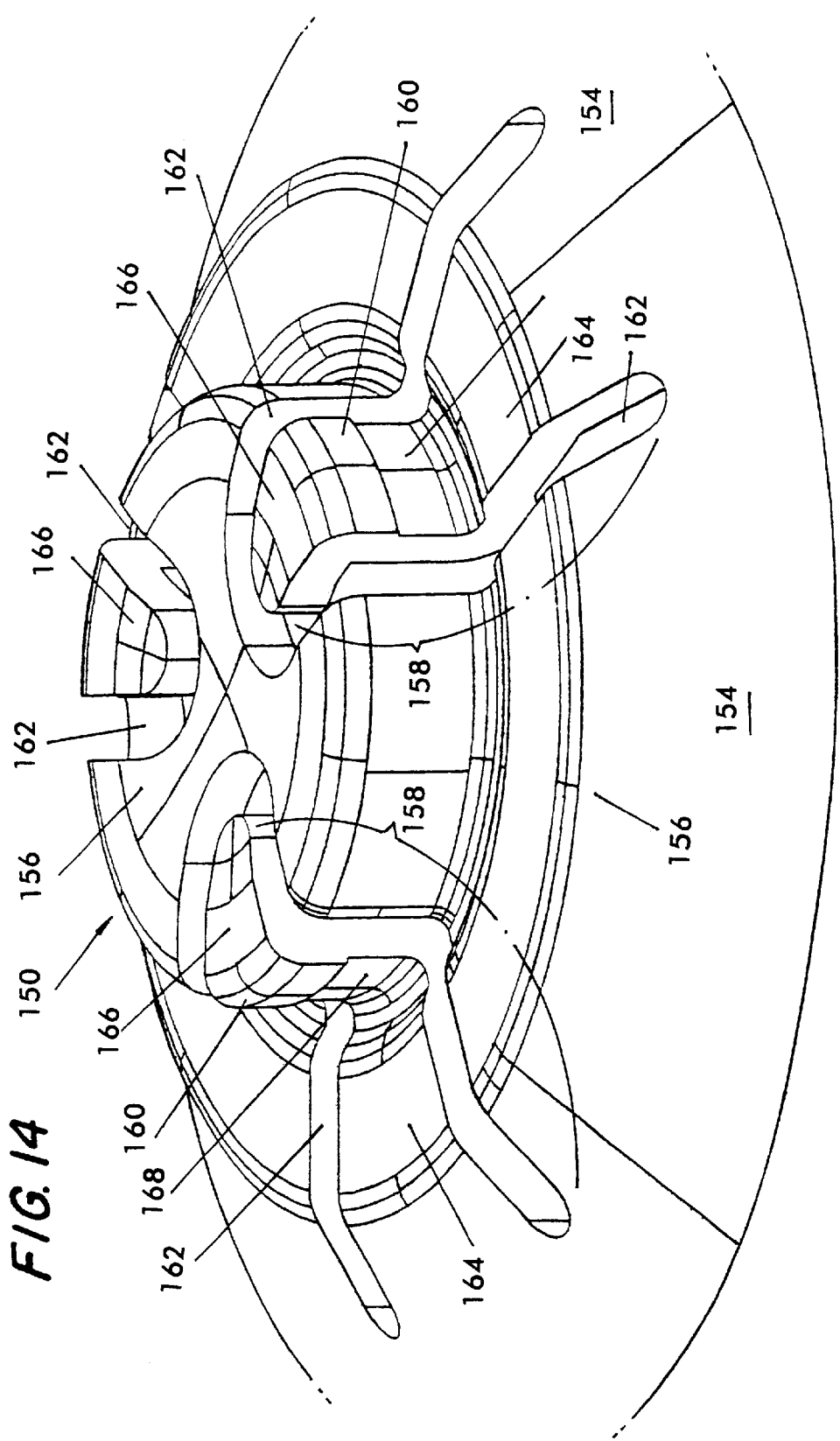
FIG. 14 is a perspective view of another embodiment of a hub used in accordance with the invention.

Referring to FIG. 14, there is shown another embodiment of a hub used to seat and retain recording medium 70 thereon that can be used with the security features of the present invention. It should be realized by those skilled in the art, however, that any known hub that seats and retains a recording medium can be used in combination with the security features of the present invention. In FIG. 14, a hub 150 is substantially cylindrical in shape and is disposed upon and integral with a frustrum portion 154. Hub 150 is designed so that it puts minimal stress on storage medium 70 when it is stored on hub 150, and when recording medium 70 is lifted or removed therefrom.

Hub 150 and frustrum portion 154 are comprised of a Y-shaped member 156 fixed to bottom cover 54 (not explicitly shown in the figure). Y-shaped member 156 defines three voids 162 having a substantially arcuate cross-section. Three resilient members 158 are disposed radially about Y-shaped member 156 within voids 162. Each resilient member 158 includes a base portion 164 that extends perpendicular to a body portion 168. A head portion 166 has a substantially arcuate cross-section and extends substantially perpendicular to body portion 168 and parallel to base portion 164. Head portion 166 further includes a protrusion 160 extending radially therefrom. Referring also to FIG. 1, resilient members 158 are biased radially outwardly so that the circumference of a circle drawn around protrusions 160 is larger than the circumference of opening 72 of recording medium 70.

In use, when recording medium 70 is to placed upon hub 150, opening 72 is placed around protrusions 160. A downward force is applied upon recording medium 70 and causes head portions 166 of resilient members 158 to bend further inwardly into voids 162 due to the engagement of unused portion 74 with protrusions 160. Upon the application of sufficient downward force upon recording medium 70, resilient members 158 will bend inwardly far enough so that the circumference around protrusions 160 will be less than the circumference of opening 72 thereby allowing recording medium 70 to be placed upon frustrum 154. At this point, unused portion 74 no longer applies a force upon protrusions 160 and resilient members 158 resume their original position due to their natural resiliency. Protrusions 160 now retain recording medium 70 on frustrum 154 and feet 64 with minimal stress on medium 70. In order to remove recording medium 70, a user will place his fingers in recesses 66, apply a force upon hub 150, and lift off recording medium 70 therefrom with minimal effort. In this way, recording medium 70 can be safely placed upon and removed from hub 150 without being damaged. It should be noted that although three resilient members and voids are shown, the invention can still be realized with the use of only one resilient member and corresponding void.

Therefore, by providing a bottom cover with a hub comprised of a cylinder disposed upon a frustum shaped member, a recording medium can be safely placed and removed on the bottom cover without placing undue stress or pressure on the recording medium. A frustum shaped member with crescents thereon disposed on the top cover, inhibits vertical movement of the recording medium while the recording medium is stored in the storage case. Side walls on the top and bottom covers provide further security for the storage case by inhibiting access to the inside of the storage case. Providing a lock which has the same width as the width of the combination of the top and bottom covers of the storage case (which is approximately equal to the width of the spine) and secures the storage case closed on four sides, yields a secure storage case that meets desirable size objectives.

Although the present invention has been described in relation to particular embodiments thereof, many other variations and modifications and other uses will become apparent to those skilled in the art.

What is claimed is:

1. A storage case for storing a recording medium having an opening with an opening width, the storage case comprising:
- a first cover, the first cover including a seating area to seat the recording medium;
- a second cover hingedly coupled to the first cover, the first and second covers capable of moving to a closed position whereby the second cover is placed over the first cover to restrict access to the seating area;
- a hub having a top portion, the hub extending upwardly from the first cover to receive the recording medium opening when the recording medium sits on the seating area, the hub having a maximum external width which is less than or equal to the opening width, the maximum external width being substantially uniform over a length of the hub;
- wherein the hub is disposed upon a support adapted to support at least a portion of the recording medium, the support having an external width greater than the opening width; and
- a hub coupling member disposed on the second cover, the hub coupling member including at least one projection extending towards the first cover substantially opposite the support and past the top of the hub when the storage case is engaged in the closed position.

2. The storage case as claimed in claim 1, wherein the hub coupling member is sized so that when the first and second covers are in the closed position, the at least one projection restricts the recording medium's movement along the length of the hub.

3. A storage case for storing a recording medium having an opening with an opening width, the storage case comprising:
- a first cover, the first cover including a seating area to seat the recording medium;
- a second cover hingedly coupled to the first cover, the first and second covers capable of moving to a closed position whereby the second cover is placed over the first cover to restrict access to the seating area;
- a hub disposed upon and extending upwardly from the first cover to receive the recording medium opening when the recording medium sits on the seating area, the hub having a maximum external width which is less than or equal to the opening width, the maximum external width being substantially uniform over a length of the hub;
- wherein the hub is disposed upon a support having an external width greater than the opening width; and
- a hub coupling member disposed on the second cover, the hub coupling member including at least two projections extending on either side of the hub coupling member to receive the hub therebetween when the first and second covers are in the closed position;
- wherein the hub coupling member is sized so that when the first and second covers are in the closed position, the at least two projections restrict the recording medium's movement along the length of the hub.

4. The storage case as claimed in claim 3, wherein the two projections extend from a support member.

5. A storage case for storing a recording medium having an opening with an opening width, the storage case comprising:
- a first cover, the first cover including a seating area to seat the recording medium;
- a second cover hingedly coupled to the first cover, the first and second covers capable of moving to a closed position whereby the second cover is placed over the first cover to restrict access to the seating area;
- a hub disposed upon the first cover to receive the recording medium opening when the recording medium sits on the seating area, the hub having a maximum external width which is less than or equal to the opening width, the maximum external width being substantially uniform over a length of the hub; and
- a hub coupling member disposed on the second cover, the hub coupling member including at least two projections extending from the second cover to receive the hub therebetween when the first and second covers are in the closed position, the at least two projections being sized and arranged so that when the first and second covers are in the closed position, the at least two projections contact an unrecorded portion of the recording medium to restrict the recording medium's movement along the length of the hub.

6. A storage case for storing a recording medium having an opening with an opening width, the storage case comprising:
- a first cover, the first cover including a seating area to seat the recording medium;
- a second cover hingedly coupled to the first cover, the first and second covers capable of moving to a closed position whereby the second cover is placed over the first cover to restrict access to the seating area;
- a hub disposed upon and extending upwardly from the first cover to receive the recording medium opening when the recording medium sits on the seating area;
- the first cover includes a first lock portion which extends for substantially the full width of the first cover; and
- the second cover includes a second lock portion which extends for substantially the full width of the second cover; wherein
  - the first and second lock portions are stepped inwardly from the first and second covers respectively, whereby a thickness of a combination of the first and second covers is greater than a thickness of a combination of the first and second lock portions.

7. A storage case for storing a recording medium having an opening with an opening width, the storage case comprising:
- a first cover, the first cover including a seating area to seat the recording medium;
- a second cover hingedly coupled to the first cover, the first and second covers capable of moving to a closed position whereby the second cover is placed over the first cover to restrict access to the seating area;
- a hub disposed upon and extending upwardly from the first cover to receive the recording medium opening when the recording medium sits on the seating area, the hub having a maximum external width which is less than or equal to the opening width, the maximum external width being substantially uniform over a length of the hub;
- a first lock portion included on the first cover;
- a second lock portion included on the second cover;
- wherein the first and second lock portions are disposed inwardly from the first and second covers respectively, whereby a thickness of a combination of the first and second covers is greater than a thickness of a combination of the first and" second lock portions, and the combination of the first and second covers includes a top portion and a bottom portion; and a lock having two lock side walls and two lock end portions, the lock side walls being disposed around the first and second lock portions, and the lock end portions being disposed over the respective top and bottom portions.

8. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width, the maximum external is width being substantially uniform over a length of the hub;

wherein the hub is disposed upon a support having an external width greater than the opening width;

a first lock portion included on the first cover;

a second lock portion included on the second cover;

wherein the first and second lock portions are disposed inwardly from the first and second covers respectively, whereby a thickness of a combination of the first and second covers is greater than a thickness of a combination of the first and second lock portions, and the combination of the first and second covers includes a top portion and a bottom portion; and a lock having two lock side walls and two lock end portions, the lock side walls being disposed around the first and second lock portions, and the lock end portions being disposed around the respective top and bottom portions, wherein the lock side walls are flush with the first and second covers respectively.

9. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width, the maximum external width being substantially uniform over a length of the hub; wherein the hub is disposed upon a support having an external width greater than the opening width;

a first lock portion included on the first cover;

a second lock portion included on the second cover;

wherein the first and second lock portions are disposed inwardly from the first and second covers respectively, whereby a thickness of a combination of the first and second covers is greater than a thickness of a combination of the first and second lock portions, and the combination of the first and second covers includes a top portion and a bottom portion; and a lock having two lock side walls and two lock end portions, the lock side walls being disposed around the first and second lock portions, and the lock end portions being disposed over the respective top and bottom portions, wherein a width of the lock is approximately equal to a width of a combination of the first and second covers.

10. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width, the maximum external width being substantially uniform over a length of the hub;

wherein the hub is disposed upon a support having an external width greater than the opening width;

a spine coupling the first and second covers together, the spine having a length, a width and a pi shaped reinforcing member extending upwardly therefrom, the reinforcing member preventing the spine from being cut open;

the first cover including a first side wall extending upwardly therefrom and having a first side wall height;

the second cover including a second side wall extending upwardly therefrom and having a second side wall height; wherein said first and second side wall heights are substantially equal; and a sum of the first and second side wall heights is approximately equal to the width of the spine.

11. A storage case for storing a storage medium, the storage case comprising:

a first cover pivotably coupled to a spine;

a second cover pivotably coupled to the spine;

the first cover including a first lock portion disposed distal from the spine and extending for substantially the full width of the first cover; and the second cover including a second lock portion disposed distal from the spine and extending for substantially the full width of the second cover;

wherein the first and second lock portions are stepped inwardly from the first and second covers respectively, whereby a thickness of a combination of the first and second covers is greater than a thickness of a combination of the first and second lock portions.

12. The storage case as claimed in claim 11, wherein the spine has a length and a width; and the first cover includes a first side wall extending upwardly therefrom and having a first side wall height;

the second cover includes a second side wall, extending upwardly therefrom and having a second side wall height; and wherein the first and second side wall heights are substantial equal; and a sum of the first and second side wall heights is approximately equal to the width of the spine.

13. The storage case as claimed in claim 12, wherein the first side wall is disposed at a portion of the first cover which is proximate to the spine; and the second side wall disposed at a portion of the second cover which is proximate to the spine.

14. The storage case as claimed in claim 12, wherein when the first and second covers are closed upon each other, the first and second side walls form a third wall which is parallel to the spine.

15. The storage case as claimed in claim 12, wherein the spine further comprises a reinforcing member that extends upwardly therefrom and along a portion of the spine, the reinforcing member preventing the spine from being cut open.

16. The storage case as claimed in claim 11, further comprising:

a hub disposed upon and extending upwardly from the first cover, the hub receives the recording medium, the hub having a maximum external width which is less than or equal to an opening width of the recording medium.

17. The storage case as claimed in claim 16, wherein the hub has a smooth external surface.

18. The storage case as claimed in claim 16, wherein:

the hub is integral with a support thereby forming a hub-support combination;

the hub-support combination is comprised of a fixed member fixed with respect to the first cover; and the hub-support combination is further comprised of at least one resilient member, the resilient member is movable with respect to the first cover and is biased outwardly away from the fixed member.

19. The storage case as claimed in claim 18, where the resilient member includes a protrusion extending outwardly therefrom.

20. The storage case as claimed in claim 18, where the fixed member is y-shaped.

21. The storage case as claimed in claim 20, wherein the fixed member defines at least one void capable of receiving the resilient member.

22. A storage case for storing a storage medium, the storage case comprising:

a first cover pivotably coupled to a spine;

a second cover pivotably coupled to the spine;

the first cover including a first lock portion disposed distal from the spine extending for substantially the full width of the first cover; and the second cover including a second lock portion disposed distal from the spine extending for substantially the full width of the second cover;

wherein the first and second lock portions are disposed inwardly from the first and second covers respectively, whereby a thickness of a combination of the first and second covers is greater than a thickness of a combination of the first and second lock portions; and a lock having lock side walls, the lock side walls being disposed around the first and second lock portions.

23. A storage case for storing a storage medium, the storage case comprising:

a first cover pivotably coupled to a spine;

a second cover pivotably coupled to the spine;

the first cover including a first lock portion disposed distal from the spine; and the second cover including a second lock portion disposed distal from the spine;

wherein the first and second lock portions are disposed inwardly from the first and second covers respectively, whereby a thickness of a combination of the first and second covers is greater than a thickness of a combination of the first and second lock portions; and a lock having lock side walls, the lock side walls being disposed around the first and second lock portions;

wherein the lock side walls are flush with the first and second covers respectively.

24. A storage case for storing a storage medium, the storage case comprising:

a first cover pivotably coupled to a spine;

a second cover pivotably coupled to the spine;

the first cover including a first lock portion disposed distal from the spine; and the second cover including a second lock portion disposed distal from the spine;

wherein the first and second lock portions are disposed inwardly from the first and second covers respectively, whereby a width of a combination of the first and second covers is wider than a width of a combination of the first and second lock portions; and a lock having lock side walls, the lock side walls being wrapped around the first and second lock portions;

wherein a thickness of the lock is approximately equal to a thickness of a combination of the first and second covers.

25. A storage case for storing a storage medium, the storage case comprising:

a first cover pivotably coupled to a spine having a length and a width;

a second cover pivotably coupled to the spine;

the first cover including a first lock portion disposed distal from the spine; and the second cover including a second lock portion disposed distal from the spine;

wherein the first and second lock portions are disposed inwardly from the first and second covers respectively, whereby a width of a combination of the first and second covers is wider than a width of a combination of the first and second lock portions;

a first side wall included on the first cover extending upwardly therefrom and having a first side wall height;

a second side wall included on the second cover extending upwardly therefrom and having a second side wall height, wherein the first and second side wall heights are substantially equal, and a sum of the first and second side wall heights is approximately equal to the width of the spine; and a pi shaped reinforcing member located on the spine extending upwardly therefrom, the reinforcing member preventing the spine from being cut open.

26. A storage case for storing a recording medium, the storage case comprising:

a first cover;

a second cover;

a hub disposed on one of the first and second covers to receive the recording medium;

a spine coupling the first and second covers together, the spine having a length and width, a raised end portion and a reinforcing member extending upwardly from the spine and along a portion of the length of the spine, the reinforcing member preventing the spine from being cut open;

the first cover including a first side wall extending upwardly therefrom and having a first height;

the second cover including a second side wall extending upwardly therefrom and having a second height;

the first and second side walls extending adjacent to and along substantially all of the length of the spine;

a sum of the first and second heights is approximately equal to the width of the spine.

27. A storage case for storing a recording medium, the storage case comprising:

a first cover;

a second cover;

a hub disposed on one of the first and second covers to receive the recording medium;

a spine coupling the first and second covers together, the spine having a length, a width and a pi shaped reinforcing member extending upwardly therefrom, the reinforcing member preventing the spine from being cut open;

the first cover including a first side wall extending upwardly therefrom and having a first height;

the second cover including a second side wall extending upwardly therefrom and having a second height;

the first and second side walls extending along substantially all of the length of the spine;

the first and second heights are substantially equal; and a sum of the first and second heights is approximately equal to the width of the spine.

28. A storage case for storing a recording medium, the storage case comprising:

a spine having a longitudinal axis;

a bottom cover hingedly coupled to the spine, the bottom cover including a seating area to seat the recording medium, a first pair of oppositely disposed bottom closing walls extending substantially perpendicular to the longitudinal axis of the spine, and a second bottom closing wall located opposite the spine and extending substantially parallel thereto;

a top cover hingedly coupled to the spine, the top cover including a first pair of oppositely disposed top closing walls extending substantially perpendicular to the longitudinal axis of the spine and a second top closing wall located opposite to the spine and extending substantially parallel thereto;

the top and bottom pairs of closing walls are disposed so that when the top cover is closed upon the bottom cover, each of the respective top and bottom closing walls sits behind the other of the respective top and bottom closing walls thereby forming a double wall and so that each of the respective top and bottom closing walls substantially overlaps a major portion of the height of the other of the respective top and bottom closing walls, wherein in the closed position, a compartment is formed to enclose and restrict access to the seating area, the compartment defined by the overlapping top and bottom closing walls, the second bottom closing wall, the second top closing wall, and the spine; and a lock, the lock releasably coupled to the case when closed to block access to the second top and bottom closing walls when locked.

29. The storage case of claim 28, wherein the lock completely covers the second top and bottom closing walls.

30. The storage case of claim 28, further comprising a retainer member to receive and retain the recording medium.

31. A storage case for storing a recording medium, the storage case comprising:

a spine having a longitudinal axis;

a bottom cover hingedly coupled to the spine, the bottom cover including a seating area to seat the recording medium, a first pair of oppositely disposed bottom closing walls extending substantially perpendicular to the longitudinal axis of the spine, and a second bottom closing wall located opposite the spine and extending substantially parallel thereto;

a top cover hingedly coupled to the spine, the top cover including a first pair of oppositely disposed top closing walls extending substantially perpendicular to the longitudinal axis of the spine and a second top closing wall located opposite to the spine and extending substantially parallel thereto;

the top and bottom pairs of closing walls are disposed so that when the top cover is closed upon the bottom cover, each of the respective top and bottom closing walls sits behind the other of the respective top and bottom closing walls thereby forming a double wall and so that each of the respective top and bottom closing walls substantially overlaps a major portion of the height of the other of the respective top and bottom closing walls, wherein in the closed position, a compartment is formed to enclose and restrict access to the seating area, the compartment defined by the overlapping top and bottom closing walls, the second bottom closing wall, the second top closing wall, and the spine;

a lock, the lock releasably coupled to the case when closed to block access to the second top and bottom closing walls, and a hub disposed upon and extending upwardly from the bottom cover, the hub receives the recording medium, the hub having a maximum external width which is less than or equal to an opening width of the recording medium.

32. The storage case as claimed in claim 31, wherein the hub has a smooth external surface.

33. The storage case as claimed in claim 31, wherein:

the hub is integral with a support thereby forming a hub-support combination;

the hub-support combination is comprised of a fixed member fixed with respect to the first cover; and the hub-support combination is further comprised of at least one resilient member, the resilient member is movable with respect to the first cover and is biased outwardly away from the fixed member.

34. The storage case as claimed in claim 33, where the resilient member includes a protrusion extending outwardly therefrom.

35. The storage case as claimed in claim 33, where the fixed member is y-shaped.

36. The storage case as claimed in claim 35, wherein the fixed member defines at least one void capable of receiving the resilient member.

37. A storage, case for storing a recording medium, the storage case comprising:

a spine having a longitudinal axis and at least one substantially pi shaped projection extending upwardly therefrom;

a bottom cover hingedly coupled to the spine, the bottom cover including a seating area to seat the recording medium; and a top cover hingedly coupled to the spine; wherein
the top and bottom covers are capable of moving to a closed position whereby the top cover is placed over the bottom cover to restrict access to the seating area; and when the top cover is closed upon the bottom cover, the projection is effective to inhibit an opening of the spine.

38. The storage case as claimed in claim 37 further comprising:

a hub disposed upon and extending upwardly from the first cover to receive the recording medium, the hub having a maximum external width which is less than or equal to an opening width of the recording medium.

39. The storage case as claimed in claim 38, wherein the hub has a smooth external surface.

40. The storage case as claimed in claim 38, wherein:
the hub is integral with a support thereby forming a hub-support combination;
the hub-support combination is comprised of a fixed member fixed with respect to the first cover; and
the hub-support combination is further comprised of at least one resilient member, the resilient member is movable with respect to the first cover and is biased outwardly away from the fixed member.

41. The storage case as claimed in claim 40, where the resilient member includes a protrusion extending outwardly therefrom.

42. The storage case as claimed in claim 40, where the fixed member is y-shaped.

43. The storage case as claimed in claim 42, wherein the fixed member defines at least one void capable of receiving the resilient member.

44. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width;

wherein the hub is disposed upon a support having an external width greater than the opening width; and a hub coupling member disposed on the second cover, the hub coupling member including at least two projections extending from the second cover to receive the hub therebetween when the first and second covers are in the closed position, the at least two projections being sized and arranged so that when the first and second cover are in the closed position, the at least two projections contact a recorded portion of the recording medium to restrict the recording medium's movement along the length of the hub.

45. A storage case for storing a recording medium having an opening with an opening width, the storage case comprising:

a first cover, the first cover including a seating area to seat the recording medium and a first lock portion;

a second cover hingedly coupled to the first cover and including a second lock portion, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width;

wherein the first and second lock portions are disposed inwardly from the first and second covers respectively, whereby the combination of the first and second covers includes a top portion and a bottom portion;

wherein the hub is disposed upon a support having an external width greater than the opening width; and a lock having two lock side walls and two lock end portions, the lock side walls being disposed around the first and second lock portions, and the lock end portions being disposed around the respective top and bottom portions;

wherein the lock side walls are flush with the first and second covers respectively.

46. A storage case for storing a recording medium having an opening with an opening width, the storage case comprising:

a first cover, the first cover including a seating area to seat the recording medium and a first lock portion;

a second cover hingedly coupled to the first cover and including a second lock portion, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width;

wherein the first and second lock portions are disposed inwardly from the first and second covers respectively, whereby the combination of the first and second covers include a top portion and a bottom portion;

wherein the hub is disposed upon a support having an external width greater than the opening width; and a lock having two lock side walls and two lock end portions, the lock side walls being disposed around the first and second lock portions, and the lock end portions being disposed over the respective top and bottom portions;

wherein a width of the lock is approximately equal to a width of a combination of the first and second covers.

47. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon and extending upwardly from the first cover to receive the recording medium opening when the recording medium sits on the seating area, the hub having a maximum external width which is less than or equal to the opening width;

wherein the hub is disposed upon a support having an external width greater than the opening width;

a spine coupling the first and second cover together, the spine having a length and a width;

the first cover including a first side wall extending upwardly therefrom and having a first side wall height;

the second cover including a second side wall extending upwardly therefrom and having a second side wall height;

said first and second side wall heights are substantially equal;

a sum of the first and second side wall heights is approximately equal to the width of the spine;

the spine further comprises a reinforcing member extending upwardly therefrom, the reinforcing member preventing the spine from being cut open; and the reinforcing member is pi shaped.

48. The storage case as claimed in claim 47, further comprising:

a hub disposed upon and extending upwardly from the first cover, the hub receives the recording medium, the hub having a maximum external width which is less than or equal to an opening width of the recording medium.

49. The storage case as claimed in claim 48, wherein the hub has a smooth external surface.

50. The storage case as claimed in claim 48, wherein:

the hub is integral with a support thereby forming a hub-support combination;

the hub-support combination is comprised of a fixed member fixed with respect to the first cover; and the hub-support combination is further comprised of at least one resilient member, the resilient member is movable with respect to the first cover and is biased outwardly away from the fixed member.

51. The storage case as claimed in claim 50, where the resilient member includes a protrusion extending outwardly therefrom.

52. The storage case as claimed in claim 50, where the fixed member is y-shaped.

53. The storage case as claimed in claim 52, wherein the fixed member defines at least one void capable of receiving the resilient member.

54. The storage case as claimed in claim 50, further comprising:

a hub disposed upon and extending upwardly from the bottom cover, the hub receives the recording medium, the hub having a maximum external width which is less than or equal to an opening width of the recording medium;

the hub is integral with a support thereby forming a hub-support combination;

the hub-support combination is comprised of a fixed member fixed with respect to the first cover;

the hub-support combination is further comprised of at least one resilient member, the resilient member is movable with respect to the first cover and is biased outwardly away from the fixed member; and the fixed member is y-shaped.

55. The storage case as claimed in claim 54, wherein the fixed member defines at least one void capable of receiving the resilient member.

56. A storage case for storing a storage medium, the storage case comprising:

a first cover;

a second cover;

the first cover including a first lock portion which extends for substantially the full width of the first cover;

the second cover including a second lock portion which extends for substantially the full width of the second cover; wherein the first and second lock portions are disposed inwardly from the first and second covers respectively, whereby a thickness of a combination of the first and second covers is greater than a thickness of a combination of the first and second lock portions; and a lock having lock side walls, the lock side walls being disposed around the first and second lock portions.

57. The storage case as claimed in claim 56, wherein the lock side walls are flush with the first and second covers respectively.

58. The storage case as claimed in claim 56, wherein a width of the lock is approximately equal to a width of a combination of the first and second covers.

59. A storage case for storing a recording medium, the storage case comprising:

a first cover;

a second cover;

a spine coupling the first and second cover together, the spine having a length and a width;

the first cover including a first side wall extending upwardly therefrom and having a first height;

the second cover including a second side wall extending upwardly therefrom and having a second height;

the first and second heights are substantially equal;

a sum of the first and second height is approximately equal to the width of the spine;

wherein the spine further comprises a reinforcing member extending upwardly therefrom, the reinforcing member preventing the spine from being cut open; and wherein the reinforcing member is pi shaped.

60. A storage case for storing a recording medium, the storage case comprising:

a spine having a longitudinal axis;

a bottom cover hingedly coupled to the spine, the bottom cover including a seating area to seat the recording medium, and a first pair of oppositely disposed bottom closing walls extending substantially perpendicular to the longitudinal axis of the spine;

a top cover hingedly coupled to the spine, the top cover including a first pair of oppositely disposed top closing walls extending substantially perpendicular to the longitudinal axis of the spine;

at least one front closing wall located opposite to the spine and extending substantially parallel thereto, the at least one front closing wall extending from at least one of the top and bottom covers;

the top and bottom pairs of closing walls are disposed so that when the top cover is closed upon the bottom cover, each of the respective top and bottom closing walls sits behind the other of the respective top and bottom closing walls thereby forming a double wall and so that each of the respective top and bottom closing walls substantially overlaps a major portion of the height of the other of the respective top and bottom closing walls, wherein in the closed position, a compartment is formed to enclose and restrict access to the seating area, the compartment defined by the spine, the overlapping top and bottom closing walls, and the at least one front closing wall; and a lock, the lock releasably coupled to the case when closed to block access to the at least one front closing wall when locked.

61. The storage case of claim 60, wherein the lock completely covers the at least one front closing wall.

62. The storage case of claim 60, further comprising a retainer member to receive and retain the recording medium.

63. A storage case for storing a recording medium, the storage case comprising:

a spine having a longitudinal axis;

a bottom cover hingedly coupled to the spine, the bottom cover including a seating area to seat the recording medium, and a first front closing wall located opposite the spine and extending substantially parallel thereto;

a top cover hingedly coupled to the spine, the top cover including a second front closing wall located opposite to the spine and extending substantially parallel thereto;

at least one top closing wall extending from each of the top and bottom covers substantially perpendicular to the longitudinal axis of the spine;

at least one bottom closing wall extending from each of the top and bottom covers substantially perpendicular to the longitudinal axis of the spine;

the top and bottom closing walls are disposed so that when the top cover is closed upon the bottom cover, one of the top and bottom closing walls sits behind the other of the top and bottom closing walls thereby forming a double wall and so that one of the top and bottom closing walls substantially overlaps a major portion of the height of the other of the top and bottom closing walls, wherein in the closed position a compartment is formed to enclose and restrict access to the seating area, the compartment including the spine, the overlapping top and bottom closing walls, the first front closing wall and the second front closing wall; and a lock, the lock releasably coupled to the case when closed to block access to the first and second front closing walls when locked.

64. The storage case of claim 63, wherein the lock completely covers the first and second front closing walls.

65. The storage case of claim 63, further comprising a retainer member to receive and retain the recording medium.

66. A storage case for storing a recording medium, the storage case comprising:

a first cover;

a second cover;

at least one top wall portion extending from each of the first and second covers;

at least one bottom wall portion extending from each of the first and second covers;

at least one end wall portion extending from at least one of the first and second covers;

a hub disposed on one of the first and second covers to receive the recording medium;

a spine coupling the first and second covers together, the spine having a length, a width and end portions, the end portions extending upwardly from the ends of the spine and having a width substantially equal to the width of the spine, the spine in combination with the top wall portions and the bottom wall portions and the at least one end wall portion defining a first compartment to prevent access to the hub when the first and second covers are closed;

at least one inner wall portion extending upwardly from either or both of the first and second covers, the at least one inner wall portion forming an inner side wall which when the first and second covers are closed, has a height substantially equal to the width of the spine and extends adjacent to and substantially along the length of the spine;

wherein when the first and second covers are closed, the inner side wall, the top wall portions, the bottom wall portions and the end wall portions define a second compartment to prevent access to the hub.

67. The storage case as claimed in claim 66, wherein the first compartment and the second compartment share at least one top wall portion, at least one bottom wall portion and the at least one end wall portion.

68. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub area disposed upon and extending upwardly from the first cover to receive the recording medium opening when the recording medium sits on the seating area, the hub area including a hub portion having a top portion and a maximum external width which is less than or equal to the opening width, the maximum external width being substantially uniform over a length of the hub portion;

the hub area including a support portion adapted to support at least a portion of the recording medium when the hub portion receives the recording medium; and a hub coupling member disposed on the second cover, the hub coupling member including at least one projection extending from the second cover substantially opposite the support portion and past the top portion when the storage case is engaged in the closed position.

69. A storage case for storing a recording medium, the storage case comprising:

a spine having a longitudinal axis;

a bottom cover coupled to the spine, the bottom cover including a seating area to seat the recording medium, a first pair of oppositely disposed bottom closing walls extending substantially perpendicular to the longitudinal axis of the spine, and a second bottom closing wall located opposite the spine and extending substantially parallel thereto;

a top cover coupled to the spine, the top cover including a first pair of oppositely disposed top closing walls extending substantially perpendicular to the longitudinal axis of the spine and a second top closing wall located opposite to the spine and extending substantially parallel thereto;

the top and bottom pairs of closing walls are disposed so that when the top cover is closed upon the bottom cover, each of the respective top and bottom closing walls substantially overlaps at least a major portion of the height of the other of the respective top and bottom closing walls thereby forming a double wall, wherein in the closed position, a compartment is formed to enclose and restrict access to the seating area, the compartment defined by the overlapping top and bottom closing walls, the second bottom closing wall, the second top closing wall, and the spine; and a lock, the lock releasably coupled to the case when closed to block access to the second top and bottom closing walls when locked.

70. The storage case of claim 69, further comprising a retainer member to receive and retain the recording medium.

71. A storage case for storing a recording medium, the storage case comprising:

a spine having a longitudinal axis;

a bottom cover coupled to the spine, the bottom cover including a seating area to seat the recording medium, and a first pair of oppositely disposed bottom closing walls extending substantially perpendicular to the longitudinal axis of the spine;

a top cover coupled to the spine, the top cover including a first pair of oppositely disposed top closing walls extending substantially perpendicular to the longitudinal axis of the spine;

at least one front closing wall located opposite to the spine and extending substantially parallel thereto, the at least one front closing wall extending from at least one of the top and bottom covers;

the top and bottom pairs of closing walls are disposed so that when the top cover is closed upon the bottom cover, each of the respective top and bottom closing walls substantially overlaps at least a major portion of the height of the other of the respective top and bottom closing walls thereby forming a double wall, wherein in the closed position, a compartment is formed to enclose and restrict access to the seating area, the compartment defined by the spine, the overlapping top and bottom closing walls, and the at least one front closing wall; and a lock, the lock releasably coupled to the case when closed to block access to the at least one front closing wall when locked.

72. The storage case of claim 71, further comprising a retainer member to receive and retain the recording medium.

73. A storage case for storing a recording medium, the storage case comprising:

a spine having a longitudinal axis;

a bottom cover coupled to the spine, the bottom cover including a seating area to seat the recording medium, and a first front closing wall located opposite the spine and extending substantially parallel thereto;

a top cover coupled to the spine, the top cover including a second front closing wall located opposite to the spine and extending substantially parallel thereto;

at least one top closing wall extending from each of the top and bottom covers substantially perpendicular to the longitudinal axis of the spine;

at least one bottom closing wall extending from each of the top and bottom covers substantially perpendicular to the longitudinal axis of the spine;

the top and bottom closing walls are disposed so that when the top cover is closed upon the bottom cover, one of the top and bottom closing walls substantially overlaps at least a major portion of the height of the other one of the top and bottom closing walls thereby forming a double wall, wherein in the closed position a compartment is formed to enclose and restrict access to the seating area, the compartment including the spine, the overlapping top and bottom closing walls, the first front closing wall and the second front closing wall; and a lock, the lock releasably coupled to the case when closed to block access to the first and second front closing walls when locked.

74. The storage case of claim 73, further comprising a retainer member to receive and retain the recording medium.

75. A storage case for storing a recording medium, the storage case comprising:

a coupling portion having a longitudinal axis;

a bottom cover coupled to the coupling portion, the bottom cover including a seating area to seat the recording medium, and a first pair of oppositely disposed bottom closing walls extending substantially perpendicular to the longitudinal axis of the coupling portion;

a top cover coupled to the coupling portion, the top cover including a first pair of oppositely disposed top closing walls extending substantially perpendicular to the longitudinal axis of the coupling portion;

at least one front closing wall located opposite to the coupling portion and extending substantially parallel thereto, the at least one front closing wall extending from at least one of the top and bottom covers;

the top and bottom pairs of closing walls are disposed so that when the top cover is closed upon the bottom cover, each of the respective top and bottom closing walls substantially overlaps at least a major portion of the height of the other of the respective top and bottom closing walls thereby forming a double wall, wherein in the closed position, a compartment is formed to enclose and restrict access to the seating area, the compartment defined by the coupling portion, the overlapping top and bottom closing walls, and the at least one front closing wall; and a lock, the lock releasably coupled to the case when closed to block access to the at least one front closing wall when locked.

76. The storage case of claim 75, wherein at least one of the top cover and bottom cover is hingedly coupled to the coupling portion.

77. The storage case of claim 75, further comprising a retainer member to receive and retain the recording medium.

78. A storage case for storing a recording medium, the storage case comprising:

a first cover;

a second cover;

a hub disposed on one of the first and second covers to receive the recording medium;

a spine coupling the first and second covers together;

the first cover including a first side wall extending upwardly therefrom and having a first height;

the second cover including a second side wall extending upwardly therefrom and having a second height;

the first and second side walls extending adjacent to and along substantially all of the length of the spine;

the first and second heights are substantially equal; and wherein when the first and second covers are closed, the first and second side walls form a third wall which is substantially equal in width to the spine.

79. A storage case for storing a recording medium having an opening with an opening width, the storage case comprising:

a recording medium;

a first cover, the first cover including a seating area to seat the recording medium;

a second cover hingedly coupled to the first cover, the first and second covers capable of moving to a closed position whereby the second cover is placed over the first cover to restrict access to the seating area;

a hub disposed upon the first cover to receive the recording medium opening when the recording medium sits on the seating area, the hub having a maximum external width which is less than or equal to the opening width; and a hub coupling member disposed on the second cover, the hub coupling member being sized and arranged so that when the hub receives the recording medium and the first and second covers are in the closed position, the hub coupling member contacts an unrecorded portion of the recording medium to restrict the recording medium's movement along the length of the hub.

80. The storage case as claimed in claim 79, wherein the hub has a smooth external surface.

81. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a hub having a top portion, the hub extending upwardly from the first cover to receive the recording medium opening when the recording medium sits on the seating area, the hub having a maximum external width which is less than or equal to the opening width;

wherein the hub is disposed upon a support adapted to support at least a portion of the recording medium, the support having an external width greater than the opening width; and a hub coupling member disposed on the second cover, the hub coupling member including at least one projection extending towards the first cover substantially opposite the support and past the top of the hub when the storage case is engaged in the closed position.

82. The storage case as claimed in claim 81, wherein the hub has a smooth external surface.

83. A storage case for storing a recording medium having an opening with an opening width, the storage case comprising:

a first cover, the first cover including a seating area to seat the recording medium;

a second cover hingedly coupled to the first cover, the first and second covers capable of moving to a closed position whereby the second cover is placed over the first cover to restrict access to the seating area;

a spine coupling the first and second covers together, the spine having a length, a width and a pi shaped reinforcing member extending upwardly therefrom, the reinforcing member preventing the spine from being cut open;

the first cover including a first side wall extending upwardly therefrom and having a first side wall height;

the second cover including a second side wall extending upwardly therefrom and having a second side wall height; wherein a sum of the first and second side wall heights is approximately equal to the width of the spine.

84. A storage case for storing a recording medium, the storage case comprising:

a first cover and a second cover, the covers moveable with respect to each other;

a back wall portion;

the second cover including a seating area to seat the recording medium, and a first pair of oppositely disposed bottom closing walls extending substantially perpendicular to the back wall portion;

the first cover including a first pair of oppositely disposed top closing walls extending substantially perpendicular to the back wall portion;

the first cover including a first front closing portion and the second cover including a second front closing portion, the first and second front closing portions are disposed so that when the first cover is closed upon the second cover, the first and second front closing portions become adjacent at a front edge portion to form a front closing wall opposite to the back wall portion;

the top and bottom pairs of closing walls are disposed so that when the first cover is closed upon the second cover, each of the respective top and bottom closing walls substantially overlaps at least a major portion of the height of the other of the respective top and bottom closing walls thereby forming a double wall, wherein in the closed position, a compartment is formed to enclose and restrict access to the seating area, the compartment defined by the back wall portion, the overlapping top and bottom closing walls, and the front closing wall; and a lock, the lock releasably coupled to the case when closed to block access to the front edge portion when locked.

85. The storage case of claim 84, wherein the first and second front closing portions overlap when the front cover is closed upon the second cover.

86. The storage case of claim 84, wherein the first and second closing portions abut when they become adjacent.

87. A storage case for storing a recording medium, the storage case comprising:

a first cover and a second cover, the covers moveable with respect to each other;

a back wall portion;

the second cover including a seating area to seat the recording medium, and a first pair of oppositely disposed bottom closing walls extending substantially perpendicular to the back wall portion;

the first cover including a first pair of oppositely disposed top closing walls extending substantially perpendicular to the back wall portion;

the first cover including a first front closing portion and the second cover including a second front closing portion, the first and second front closing portions are disposed so that when the first cover is closed upon the second cover, the first and second front closing portions become adjacent at a front joint portion to form a front closing wall opposite to the back wall portion;

the top and bottom pairs of closing walls are disposed so that when the first cover is closed upon the second cover, each of the respective top and bottom closing walls substantially overlaps at least a major portion of the height of the other of the respective top and bottom closing walls thereby forming a double wall, wherein in the closed position, a compartment is formed to enclose and restrict access to the seating area, the compartment defined by the back wall portion, the overlapping top and bottom closing walls, and the front closing wall; and a lock, the lock releasably coupled to the case when closed to block access to the front joint portion when locked.

88. The storage case of claim 87, wherein the first and second front closing portions overlap when the first cover is closed upon the second cover.

89. The storage case of claim 87, wherein the first and second front closing portions abut when they become adjacent.

* * * * *